US009787830B1

(12) United States Patent
Reding et al.

(10) Patent No.: US 9,787,830 B1
(45) Date of Patent: *Oct. 10, 2017

(54) PERFORMING SPEECH RECOGNITION OVER A NETWORK AND USING SPEECH RECOGNITION RESULTS BASED ON DETERMINING THAT A NETWORK CONNECTION EXISTS

(71) Applicant: Google Inc., Mountain View, CA (US)

(72) Inventors: Craig L. Reding, Midland Park, NJ (US); Suzi Levas, Nanuet, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,837

(22) Filed: Aug. 10, 2016

Related U.S. Application Data

(60) Continuation of application No. 15/161,621, filed on May 23, 2016, which is a continuation of application No. 14/179,725, filed on Feb. 13, 2014, now Pat. No. 9,380,155, which is a continuation of application No. 13/924,112, filed on Jun. 21, 2013, now Pat. No. 8,682,663, which is a division of application No. 13/614,444, filed on Sep. 13, 2012, now Pat. No. 8,520,810, and a continuation of application No. 13/661,347, filed on Oct. 26, 2012, now Pat. No. 8,731,937, which is a continuation of application No. 13/614,444, which is a continuation of application (Continued)

(51) Int. Cl.
*G10L 15/22* (2006.01)
*H04M 3/42* (2006.01)
*G10L 15/02* (2006.01)
*G10L 13/08* (2013.01)

(52) U.S. Cl.
CPC ......... *H04M 3/42204* (2013.01); *G10L 13/08* (2013.01); *G10L 15/02* (2013.01); *G10L 15/22* (2013.01); *G10L 2015/221* (2013.01); *G10L 2015/223* (2013.01); *H04M 2201/40* (2013.01); *H04M 2207/18* (2013.01)

(58) Field of Classification Search
CPC ...................................................... G10L 15/22
USPC ....................................................... 704/235
See application file for complete search history.

(56) References Cited

U.S. PATENT DOCUMENTS 5,652,789 A 7/1997 Miner et al.
5,659,597 A 8/1997 Bareis et al.
(Continued)

OTHER PUBLICATIONS

Notice of Allowance issued in U.S. Appl. No. 13/401,932 dated Jul. 12, 2012, 13 pages.
(Continued)

*Primary Examiner* — Susan McFadden
(74) *Attorney, Agent, or Firm* — Fish & Richardson P.C.

(57) ABSTRACT

Systems, methods and apparatus for initiating communication. According to one implementation, a recording of a particular user speaking a name of a contact is obtained, a voice dialing command including an utterance of the name of the contact by the particular user is received, and in response to receiving the voice dialing command including the utterance of the name of the contact by the particular user, the recording of the particular user speaking the name of the contact or a text-to-speech audio output of the name is provided for output, and communication is initiated between the particular user and the contact.

17 Claims, 14 Drawing Sheets

Related U.S. Application Data

No. 13/423,595, filed on Mar. 19, 2012, now Pat. No. 8,335,687, which is a continuation of application No. 13/401,932, filed on Feb. 22, 2012, now Pat. No. 8,401,846, which is a continuation of application No. 12/981,396, filed on Dec. 29, 2010, now Pat. No. 8,135,589, which is a continuation of application No. 11/869,275, filed on Oct. 9, 2007, now abandoned, which is a continuation of application No. 11/137,058, filed on May 25, 2005, now Pat. No. 7,302,391, which is a continuation of application No. 09/726,971, filed on Nov. 30, 2000, now Pat. No. 6,915,262.

(56) References Cited

U.S. PATENT DOCUMENTS

| | | |
|---|---|---|
| 5,719,921 A | 2/1998 | Vysotsky et al. |
| 5,799,273 A | 8/1998 | Mitchell et al. |
| 5,893,059 A | 4/1999 | Raman |
| 5,915,001 A | 6/1999 | Uppaluru |
| 5,937,383 A * | 8/1999 | Ittycheriah ............ G10L 15/08 704/242 |
| 5,953,700 A | 9/1999 | Kanevsky et al. |
| 5,956,683 A | 9/1999 | Jacobs et al. |
| 5,960,399 A | 9/1999 | Barclay et al. |
| 5,970,446 A | 10/1999 | Goldberg et al. |
| 6,014,624 A | 1/2000 | Raman |
| 6,144,667 A | 11/2000 | Doshi et al. |
| 6,185,535 B1 | 2/2001 | Hedin et al. |
| 6,259,786 B1 | 7/2001 | Gisby |
| 6,260,012 B1 | 7/2001 | Park |
| 6,282,511 B1 | 8/2001 | Mayer |
| 6,323,306 B1 | 11/2001 | Song et al. |
| 6,363,348 B1 | 3/2002 | Besling et al. |
| 6,363,349 B1 | 3/2002 | Urs et al. |
| 6,400,806 B1 | 6/2002 | Uppaluru |
| 6,408,272 B1 | 6/2002 | White et al. |
| 6,442,519 B1 | 8/2002 | Kanevsky et al. |
| 6,463,413 B1 | 10/2002 | Applebaum et al. |
| 6,487,534 B1 | 11/2002 | Thelen et al. |
| 6,493,673 B1 | 12/2002 | Ladd et al. |
| 6,501,832 B1 | 12/2002 | Saylor et al. |
| 6,507,643 B1 | 1/2003 | Groner |
| 6,574,599 B1 | 6/2003 | Lim et al. |
| 6,633,846 B1 | 10/2003 | Bennett et al. |
| 6,650,738 B1 | 11/2003 | Pershan et al. |
| 6,690,772 B1 | 2/2004 | Naik et al. |
| 6,693,893 B1 | 2/2004 | Ehlinger |
| 6,744,861 B1 | 6/2004 | Pershan et al. |
| 6,792,083 B2 | 9/2004 | Dams et al. |
| 6,823,306 B2 | 11/2004 | Reding et al. |
| 6,832,189 B1 | 12/2004 | Kanevsky et al. |
| 6,839,670 B1 | 1/2005 | Stammler et al. |
| 6,915,262 B2 | 7/2005 | Reding et al. |
| 6,941,264 B2 | 9/2005 | Konopka et al. |
| 6,963,633 B1 | 11/2005 | Diede et al. |
| 7,302,391 B2 | 11/2007 | Reding et al. |
| 7,590,537 B2 | 9/2009 | Kim et al. |
| 7,801,515 B1 | 9/2010 | Nilsson |
| 8,135,589 B1 | 3/2012 | Reding et al. |
| 8,214,208 B2 | 7/2012 | Mallett et al. |
| 8,234,119 B2 | 7/2012 | Dhawan et al. |
| 8,335,687 B1 | 12/2012 | Reding et al. |
| 8,352,277 B2 | 1/2013 | Bennett |
| 8,401,846 B1 | 3/2013 | Reding et al. |
| 8,401,859 B2 | 3/2013 | Dhawan et al. |
| 8,494,848 B2 | 7/2013 | Reding et al. |
| 8,520,810 B1 | 8/2013 | Reding et al. |
| 8,731,937 B1 | 5/2014 | Reding et al. |
| 8,762,156 B2 | 6/2014 | Chen |
| 2002/0059066 A1 | 5/2002 | O'Hagan |
| 2002/0065657 A1 | 5/2002 | Reding et al. |
| 2008/0027723 A1 | 1/2008 | Reding et al. |

OTHER PUBLICATIONS

Notice of Allowance issued in U.S. Appl. No. 13/423,595 dated Sep. 10, 2012, 15 pages.
Notice of Allowance issued in U.S. Appl. No. 13/401,932 dated Jan. 11, 2013, 8 pages.
Office Action issued in U.S. Appl. No. 13/614,444 dated Apr. 18, 2013, 16 pages.
Office Action issued in U.S. Appl. No. 13/661,347 dated Jun. 14, 2013, 15 pages.
Notice of Allowance issued in U.S. Appl. No. 13/614,444 dated Jul. 11, 2013, 8 pages.
Notice of Allowance issued in U.S. Appl. No. 13/661,347 dated Aug. 19, 2013, 8 pages.
Office Action issued in U.S. Appl. No. 13/924,112 dated Aug. 29, 2013, 16 pages.
Office Action issued in U.S. Appl. No. 13/661,347 dated Oct. 29, 2013, 7 pages.
Notice of Allowance issued in U.S. Appl. No. 13/924,112 dated Dec. 16, 2013, 8 pages.
Notice of Allowance issued in U.S. Appl. No. 13/661,347 dated Dec. 24, 2013, 6 pages.
Office Action issued in U.S. Appl. No. 14/179,725 dated Nov. 24, 2015, 13 pages.
Notice of Allowance issued in U.S. Appl. No. 14/179,725 dated Mar. 29, 2016, 5 pages.
Office Action issued in U.S. Appl. No. 15/161,621, dated May 2, 2017, 6 pages.

* cited by examiner

PERFORMING SPEECH RECOGNITION OVER A NETWORK AND USING SPEECH RECOGNITION RESULTS BASED ON DETERMINING THAT A NETWORK CONNECTION EXISTS

CROSS REFERENCE TO RELATED APPLICATIONS

This application is a continuation application of U.S. patent application Ser. No. 15/161,621, filed May 23, 2016, which is a continuation application of U.S. patent application Ser. No. 14/179,725, filed Feb. 13, 2014, which is a continuation application of U.S. patent application Ser. No. 13/924,112, filed Jun. 21, 2013, which is a divisional application of U.S. patent application Ser. No. 13/614,444, filed Sep. 13, 2012, and a continuation application of U.S. patent application Ser. No. 13/661,347, filed Oct. 26, 2012. U.S. application Ser. No. 13/661,347 is a continuation application of U.S. patent application Ser. No. 13/614,444, filed Sep. 13, 2012, which is a continuation application of U.S. patent application Ser. No. 13/423,595, filed Mar. 19, 2012, which is a continuation application of U.S. patent application Ser. No. 13/401,932, filed on Feb. 22, 2012, which is a continuation application of U.S. patent application Ser. No. 12/981,396, filed on Dec. 29, 2010, which is a continuation application of U.S. patent application Ser. No. 11/869,275, filed on Oct. 9, 2007, which is a continuation application of U.S. patent application Ser. No. 11/137,058, filed May 25, 2005, which is a continuation application of U.S. patent application Ser. No. 09/726,971, filed on Nov. 30, 2000. The disclosures of the foregoing applications are incorporated herein by reference in their entirety.

FIELD OF THE INVENTION

The present invention is directed to speech recognition techniques and, more particularly, to methods and apparatus for generating speech recognition models, distributing speech recognition models and performing speech recognition operations, e.g., voice dialing and word processing operations, using speech recognition models.

BACKGROUND OF THE INVENTION

Speech recognition, which includes both speaker independent speech recognition and speaker dependent speech recognition, is used for a wide variety of applications.

Speech recognition normally involves the use of speech recognition models or templates that have been trained using speech samples provided by one or more individuals. Commonly used speech recognition models include Hidden Markov Models (HMMS). An example of a common template is a dynamic time warping (DTW) template. In the context of the present application "speech recognition model" is intended to encompass both speech recognition models as well as templates which are used for speech recognition purposes.

As part of a speech recognition operation, speech input is normally digitized and then processed. The processing normally involves extracting feature information, e.g., energy and/timing information, from the digitized signal. The extracted feature information normally takes the form of one or more feature vectors. The extracted feature vectors are then compared to one or more speech recognition models in an attempt to recognize words, phrases or sounds.

In speech recognition systems, various actions, e.g., dialing a telephone number, entering information into a form, etc., are often performed in response to the results of the speech recognition operation.

Before speech recognition operations can be performed, one or more speech recognition models need to be trained. Speech recognition models can be either speaker dependent or speaker independent. Speaker dependent (SD) speech recognition models are normally trained using speech from a single individual and are designed so that they should accurately recognize the speech of the individual who provided the training speech but not necessarily other individuals. Speaker independent (SI) speech recognition models are normally generated from speech provided from numerous individuals or from text. The generated speaker independent speech recognition models often represent composite models which take into consideration variations between different speakers, e.g., due to differing pronunciations of the same word. Speaker independent speech recognition models are designed to accurately identify speech from a wide range of individuals including individuals who did not provide speech samples for training purposes.

In general, model training involves one or more individuals speaking a word or phrase, converting the speech into digital signal data, and then processing the digital signal data to generate a speech recognition model. Model training frequently involves an iterative process of computing a speech recognition model, scoring the model, and then using the results of the scoring operation to further improve and retrain the speech recognition model.

Speech recognition model training processes can be very computationally complex. This is true particularly in the case of SI models where audio data from numerous speakers is normally processed to generate each model. For this reason, speech recognition models are often generated using a relatively powerful computer systems.

Individual speech recognition models can take up a considerable amount of storage space. For this reason, it is often impractical to store speech recognition models corresponding to large numbers of words or phrases, e.g., the names of all the people in a mid-sized company, or large dictionary in a portable device or speech recognizer where storage space, e.g., memory, is limited.

In addition to limits in storage capacity, portable devices are often equipped with limited processing power. Speech recognition, like the model training process, can be a relatively computationally complex process and can there for be time consuming given limited processing resources. Since most users of a speech processing system expect a prompt response from the system, to satisfy user demands speech processing often needs to be performed in real or near real time. As the number of potential words which may be recognized increases, so does the amount of processing required to perform a speech recognition operation. Thus, devices with limited processing power which may be able to perform a speech recognition operation involving recognizing, e.g., 20 possible names in near real time, may not be fast enough to perform a recognition operation in near real time where the number of names is increased to 100 possible names.

In the case of voice dialing and other applications where the recognition results need to be generated in near real time, e.g., with relatively little delay, the limited processing power of portable devices often limits the size of the vocabulary which can be considered as possible recognition outcomes.

In addition to the above implementation problems, implementers of speech recognition systems are often confronted with logistical problems associated with collecting speech samples to be used for model training purposes. This is particularly a problem in the case of speaker independent speech recognition models where the robustness of the models are often a function of the number of speech samples used for training and the differences between the individuals providing the samples. In applications where speech recognition models are to be used over a wide geographical region, it is particularly desirable that speech samples be collected from the various geographic regions where the models will ultimately be used. In this manner, regional speech differences can be taken into account during model training.

Another problem confronting implementers of speech recognition systems is that older speech recognition models may include different feature information than current speech recognition models. When updating a system to use newer speech recognition models, previously used models in addition to speech recognition software may have to be revised or replaced. This frequently requires speech samples to retrain and/or update the older models. Thus the problems of collecting training data and training speech recognition models discussed above are often encountered when updating existing speech recognition systems.

In systems using multiple speech recognition devices, speech model incompatibility may require the extraction of different speech features for different speech recognition devices when the devices are used to perform a speech recognition operation on the same speech segment. Accordingly, in some cases it is desirable to be able to supply the speech to be processed to multiple systems so that each system can perform its own feature extraction operation.

In view of the above discussion, it is apparent that there is a need for new and improved methods and apparatus relating to a wider range of speech recognition issues. For example, there is a need for improvements with regard to the collecting of speech samples for purposes of training speech recognition models. There is also a need for improved methods of providing users of portable devices with limited processing power, e.g., notebook computers and personal data assistants (PDAs) speech recognition functionality. Improved methods of providing speech recognition functionality in systems where different types of speech recognition models are used by different speech recognizers is also desirable. Enhanced methods and apparatus for updating speech recognition models are also desirable.

SUMMARY OF THE INVENTION

The present invention is directed to methods and apparatus for generating, distributing, and using speech recognition models. In accordance with the present invention, a shared, e.g., centralized, speech processing facility is used to support speech recognition for a wide variety of devices, e.g., notebook computers, business computer systems personal data assistants, etc. The centralized speech processing facility of the present invention may be located at a physically remote site, e.g., in a different room, building, or even country, than the devices to which it provides speech processing and/or speech recognition services. The shared speech processing facility may be coupled to numerous devices via the Internet and/or one or more other communications channels such as telephone lines, a local area network (LAN), etc.

In various embodiments, the Internet is used as the communications channel via which model training data is collected and/or speech recognition input is received by the shared speech processing facility of the present invention. Speech files may be sent to the speech processing facility as electronic mail (E-mail) message attachments. The Internet is also used to return speech recognition models and/or information identifying recognized words or phrases included in the processed speech. The speech recognition models may be returned as E-mail message attachments while the recognized words may be returned as text in the body of an E-mail message or in a text file attachment to an E-mail message.

Thus, via the Internet, devices with audio capture capability and Internet access can record and transmit to the centralized speech processing facility of the present invention digitized speech, e.g., as speech files. The speech processing facility then performs a model training operation or speech recognition operation using the received speech. A speech recognition model or data message including the recognized words, phases or other information is then returned depending on whether a model training or recognition operation was performed, to the device which supplied the speech.

Thus, the speech processing facility of the present invention can be used to provide speech recognition capabilities and/or to augment a device's speech processing capability by performing speech recognition model training operations and/or additional speech recognition operations which can be used to supplement local speech recognition attempts.

For example, in various embodiments of the present invention, the generation of speech recognition models to be used locally is performed by the remote speech processing facility. In one such embodiment, when the local computer device needs a speech recognition model to be trained, the local computer system collects the necessary training data, e.g., speech samples from the system user and text corresponding to the retrieved speech samples and then transmits the training data, e.g., via the Internet, to the speech processing facility of the present invention. The speech processing facility then generates one or more speech recognition models and returns them to the local computer system for use in local speech recognition operations.

In various embodiments, the shared speech processing facility updates a training database with the speech samples received from local computer systems. In this way, a more robust set of training data is created at the remote speech processing facility as part of the model training and/or updating process without imposing addition burdens on individual devices beyond those needed to support services being provided to a use of an individual device, e.g., notebook computer or PDA. As the training database is augmented, speaker independent speech recognition models may be retrained periodically using the updated training data and then transmitted to those computer systems which use speech recognition models corresponding to those models which are retrained. In this manner, multiple local systems can benefit from one or more different users initiating the retraining of speech recognition models to enhance recognition results.

As discussed above, in various embodiments, the remote speech processing facility of the present invention is used to perform speech recognition operations and then return the recognition results or take other actions based on the recognition results. For example, in one embodiment business computer systems capture speech from, e.g., customers, and then transmit the speech or extracted speech information to the shared speech processing facility via the Internet. The remote speech processing facility performs speech recognition operations on the received speech and/or received extracted speech information. The results of the recognition operation, e.g., recognized words in the form of, e.g., text, are then returned to the business computer system which supplied the processed speech or speech information. The business system can then use the information returned by the speech processing facility, e.g., recognized text, to fill in forms or perform other services such as automatically respond to verbal customer inquires. Thus, the remote speech processing method of the present invention can be used to supply speech processing capabilities to customers, e.g., businesses, who can't, or do not want to, support local speech processing operations.

In addition to providing speech recognition capabilities to systems which can't perform speech recognition locally, the speech processing facility of the present invention is used in various embodiments to augment the speech recognition capabilities of various devices such as notebook computers and personal data assistants. In such embodiments the remote speech processing facility may be used to perform speech recognition when the local device is unable to obtain a satisfactory recognition result, e.g., because of a limited vocabulary or limited processing capability.

In one particular exemplary embodiment, a notebook computer attempts to perform a voice dialing operation on received speech using locally stored speech recognition models prior to contracting the speech processing facility of the present invention. If the local speech recognition operation fails to result in the recognition of a name, the received speech or extracted feature information is transmitted to the remote speech processing facility. If the local notebook computer can't perform a dialing operation the notebook computer also transmits to the remote speech processing facility a telephone number where the user of the notebook computer can be contacted by telephone. The remote speech processing facility performs a speech recognition operation using the received speech and/or extracted feature information. If the speech recognition operation results in the recognition of a name with which a telephone number is associated the telephone number is retrieved from the remote speech processing facility's memory. The telephone number is returned to the device requesting that the voice dialing speech recognition operation be performed unless a contact telephone number was provided with the speech and/or extracted feature information. In such a case, the speech processing facility uses telephone circuitry to initiate one telephone call to the telephone number retrieved from memory and another telephone call to the received contact telephone number. When the two calls are answered, they are bridged thereby completing the voice dialing operation.

In addition to generating new speech recognition models to be used in speech processing operations and providing speech processing services, the centralized speech processing facility of the present invention can be used for modernizing existing speech recognition system but upgrading speech recognition models and the speech recognition engine used therewith. In one particular embodiment, speech recognition models or templates are received via the Internet from a system to be updated along with speech corresponding to the modeled words. The received models or templates and/or speech are used to generate updated models which include different speech characteristic information or have a different model format than the existing speech recognition models. The updated models are returned to the speech recognition systems along with, in some cases, new speech recognition engine software.

In one particular embodiment, speech recognition templates used by voice dialing systems are updated and replaced with HMMs generated by the central processing system of the present invention.

At the time the templates are replaced, the speech recognition engine software is also replaced with a new speech recognition engine which uses HMMs for recognition purposes.

Various additional features and advantages of the present invention will be apparent from the detailed description which follows.

DETAILED DESCRIPTION

As discussed above, the present invention is directed to methods and apparatus for generating speech recognition models, distributing speech recognition models and performing speech recognition operations, e.g., voice dialing and word processing operations, using speech recognition models.

Figure 1:
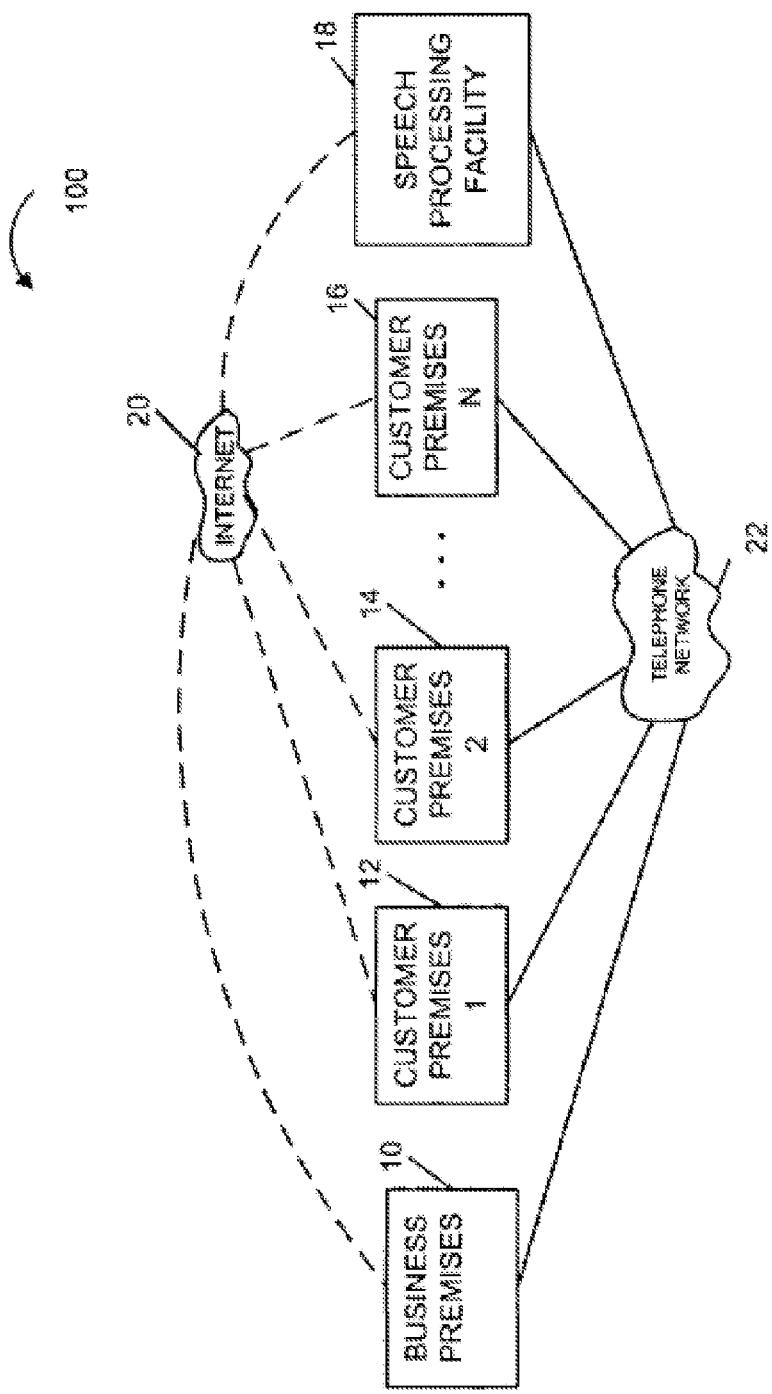
FIG. 1 illustrates a communication system implemented in accordance with an exemplary embodiment of the present invention.

FIG. 1 illustrates a communications system 100 implemented in accordance with the present invention. As illustrated, the system 100 includes a business premises 10 and customer premises 12, 14, 16. Each one of the premises 10, 12, 14, 16 represents a customer or business site. While only one business premise 10 is shown, it is to be understood that any number of business and customer premises may be included in the system 100. The various premises 10, 12, 14, 16, 18 are coupled together and to a shared speech processing facility 18 of the present invention via the Internet 20 and a telephone network 22. Connections to the Internet 20 may be via digital subscriber lines (DSL), cable modems, cable lines, high speed data links, e.g., Ti links, dial-up lines, wireless connections or a wide range of other communications channels. The premises 10, 12, 14, 16, 18 may be connected to the speech processing facility via a LAN or other communications channel instead of, or in addition to, the Internet.

While businesses have frequently contracted for high speed Internet connections, e.g., T1 links and other high speed services, which may be on during all hours of business service, residential customers are now also moving to relatively high speed Internet connections which are "always on". As part of such services, a link to the Internet is maintained while the computer user has his/her computer on avoiding delays associated with establishing an Internet connection when data needs to be sent or received over the Internet. Examples of such Internet connections include cable modem services and DSL services. Such services frequently support sufficient bandwidth for the transmission of audio signals. As the speed of Internet connections increases, the number of Internet service subscribers capable of transmitting audio signals in real or near real time will continue to increase.

The speech processing facility 18 is capable of receiving speech from the various premises 10, 12, 14, 16 and performing speech processing operations thereon. The operations may include speech model training, e.g., generation, operations and/or speech recognition operations. The results of the speech processing operation may be returned to the customer or business premises from which the speech originated. Alternatively, the speech processing facility may use the results of the speech processing operation to initiate an action such as voice dialing. In addition, received speech or data generated from received speech, such as feature vectors, may be forwarded by the speech processing facility 18 to other devices in the system 100 for use by the receiving device.

Figure 2:
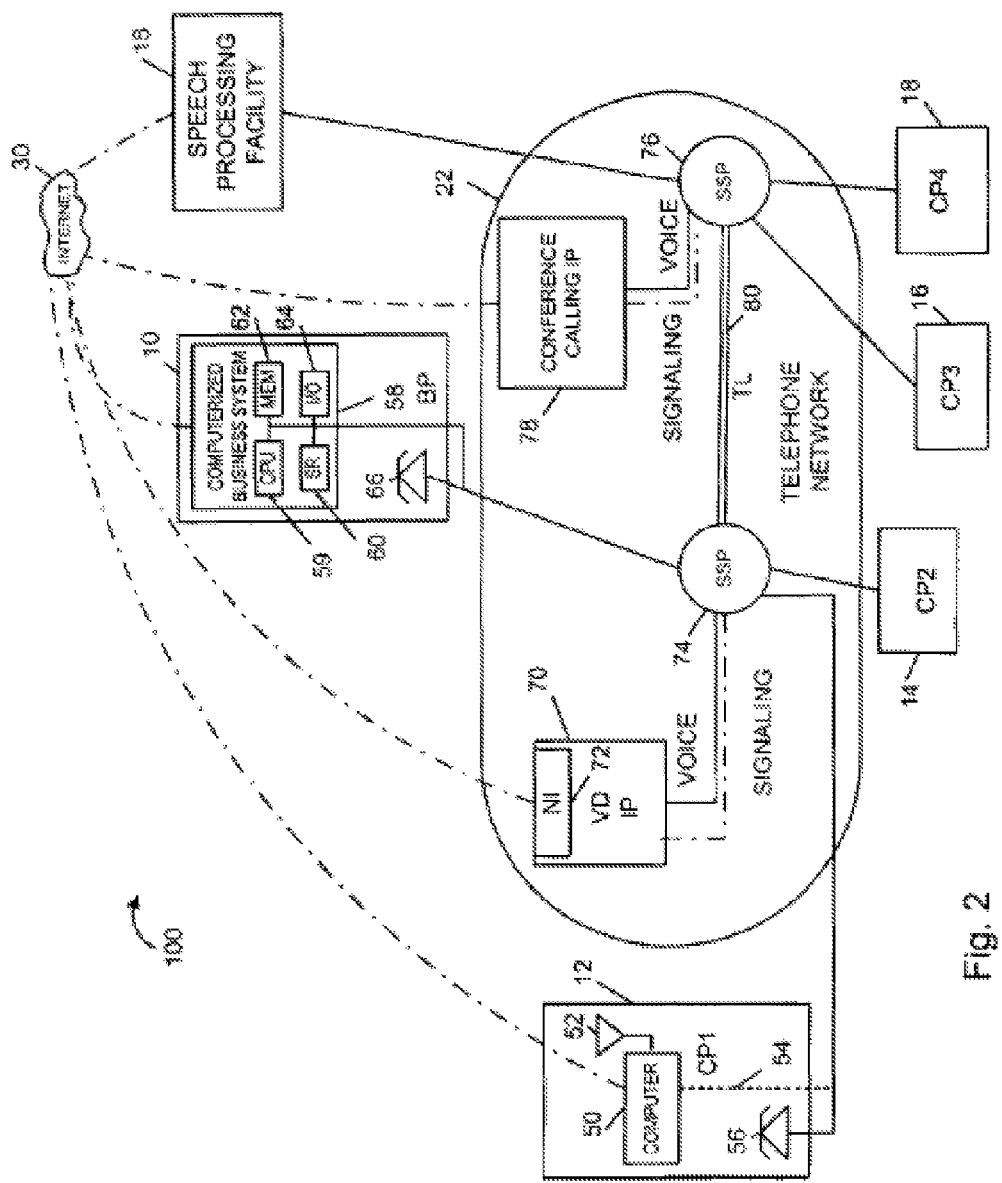
FIG. 2 illustrates the communications system of FIG. 1 in greater detail.

The system 100 is illustrated in greater detail in FIG. 2. In particular, FIG. 2 provides a more detailed illustration of the first customer premises 12, telephone network 22, and business premises 10.

The first customer premises 12 includes a computer system 50 and a telephone 56. The computer system 50 is coupled to the Internet 30, e.g., by a physical communications line 51 or by a wireless connection via antenna 52. Optionally, the computer system 50 may also be coupled to the telephone system 22 by telephone line 54, e.g., when computer telephony capabilities are supported. Telephone 56 which is also located at the first customer premises is coupled to the telephone system 22. Thus, a person located at the first customer premises 12 may, assuming the computer system 50 supports telephony capability, make and/or receive calls using either the computer 50 or telephone 56.

Business premises 10 includes a computerized business system 58 which is coupled to the Internet 30 and a telephone system 66. Both the computerized business system 58 and telephone system 66 are coupled to the telephone network 22. This allows customers to interact with the computer system 58 and a sales representative or operator working at the telephone system 66. The computerized business system 58 includes a processor, i.e., CPU 59, memory 62, input/output device 64 and speech recognition (SR) circuitry 60. Speech recognition circuitry 60 can perform speech recognition operations on speech obtained from a customer using speech recognition routines and models stored in memory 62. Sales and purchasing information may be stored in memory 62 in addition to the speech recognition routines and speech recognition models.

Telephone network 22 includes first and second telephone switches which function as signal switching points (SSPs) 74, 76. The telephone switches 74, 76 are coupled to each other via link 80 which may be, e.g., a T1 or other high bandwidth link. The telephone network also includes a voice dialing intelligent peripheral (VD IP) device 70 and a conference calling IP 78.

VD IP 70 is coupled to the Internet 30 via a network interface 72 and to the first switch 74 via a voice and signaling connection. VD IP 70 includes circuitry for performing voice dialing operations. Voice dialing operations include speech recognition operations and the placing of a call in response to the outcome of a speech recognition operation. Voice dialing IP 70 may include, for each voice dialing service subscriber supported by the VD IP 70, a voice dialing directory which includes speech recognition models of names of people who may be called, with associated telephone numbers to be dialed when the name is recognized.

Conference calling IP 78 is coupled to both the Internet 30 and SSP 76. The connection to the SSP 76 includes both voice and signaling lines. The conference calling IP 78 can, in response to information received via SSP 76 or the Internet 30, initiate calls to one or more individuals and bridge the initiated calls.

Figure 3:
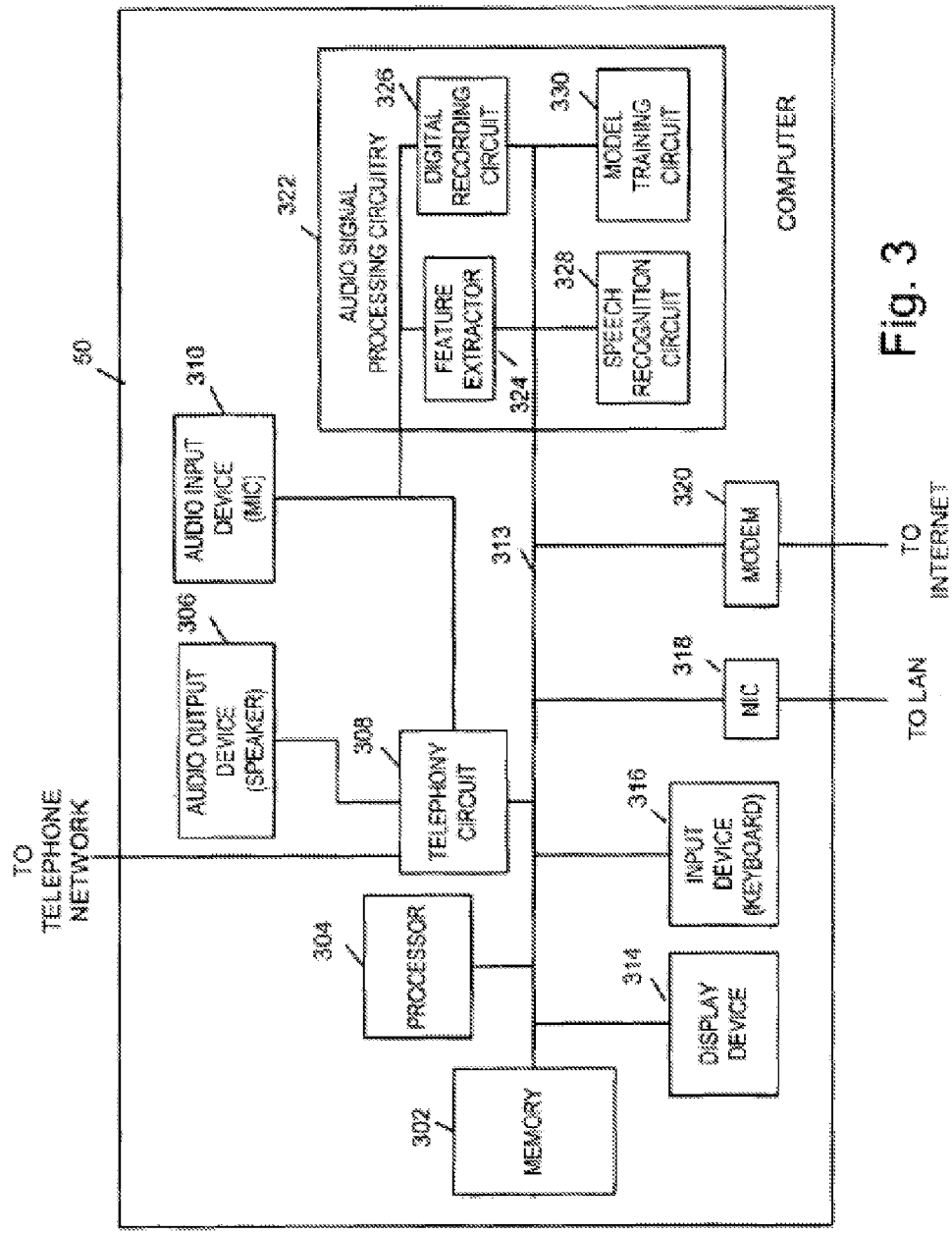
FIG. 3 illustrates a computer system for use in the communications system illustrated in FIG. 1.

FIG. 3 illustrates the computer system 50 which may be used at one or more customer premises, in greater detail. The computer 50 may be, e.g., a personal computer (PC), notebook computer, or personal data assistant (PDA). As illustrated the computer 50 includes memory 302, a processor 304, display device 314, input device 316, telephony circuit 308, network interface card (NIC) 318, modem 320 and audio signal processing circuitry 322 which are coupled together via bus 313. While not illustrated in FIG. 3, in the case where wireless Internet access is supported, modem 320 may be coupled to antenna 52 shown in FIG. 2.

Processor 304, under direction of routines stored in memory 302, controls the operation of the computer 50. Information and data may be displayed to a user of the device 50 via display 314 while data may be manually entered into the computer via input device, e.g., keyboard 316. The NIC 318 can be used to couple the computer 50 to a local area network (LAN) or other computer network. Modem 320 may be, e.g., a DSL modem, cable modem or other type of modem which can be used to connect the computer system to the Internet 30. Thus, via modem 320 the computer 50 can receive data from, and transmit data to, other devices coupled to the Internet 30.

To provide the computer system 50 with the ability to perform various telephone functions such as dial a telephone number and host telephone calls, the computer system 50 includes telephony circuit 308. An audio input device, e.g., microphone 310, provides audio input to the telephone circuit as well as audio signal processing circuitry 322. An audio output device, e.g., speaker 306, allows a user of the system to hear audio signals output by telephony circuit 308. Telephony circuit 308 includes an option connection to telephone network 22. When the optional connection to the telephone network 22 is not used, the telephony circuit 308 may still receive and send audio signals via the Internet 30.

In order to support digital recording, speech recognition model training, and speech recognition operations, audio signal processing circuitry 322 is provided. Processing circuitry 322 includes a feature extractor circuit 324, a digital recording circuit 326, a speech recognition circuit 328, and a model training circuit 330 which are all coupled to bus 313. The feature extractor 324 and digital recording circuit 326 are also coupled to the audio input device for receiving there from audio input to be processed.

Extracted feature information and digital recordings generated by circuits 324 and 326, respectively can be stored in memory 302. Memory 302 is also used to store various routines and data used by the various components of the computer system 50.

Figure 4:
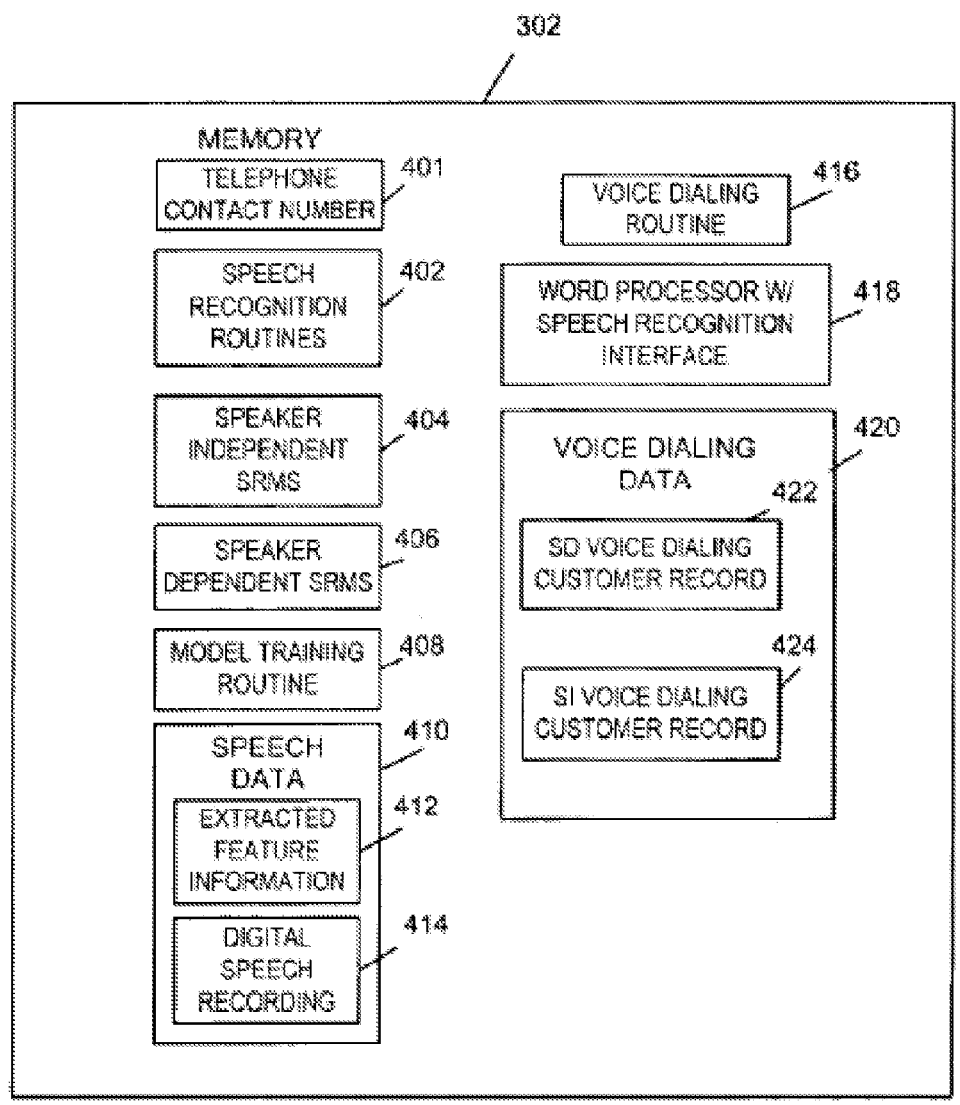
FIG. 4 illustrates memory which may be used as the memory of a computer in the system illustrated in FIG. 1.

FIG. 4 illustrates exemplary contents of memory 302 in detail. As illustrated the memory 302 includes speech recognition routines 402, speaker independent speech recognition models (SI SRMS) 404, speaker dependent speech recognition models (SD SRMS) 406, model training routine 408, stored speech data 410, a voice dialing routine 416, a word processor routine 418 which includes a speech recognition interface, and voice dialing data 420.

Speech data 410 includes extracted feature information 412, e.g., feature vectors, and digital recordings of speech 414. The feature information 412 and/or recordings 414 represent speech information which can be transmitted via the Internet for use in model training and/or speech recognition operations. The voice dialing data 420, used during voice dialing operations, includes a speaker dependent voice dialing record 422 and a speaker independent voice dialing customer record 424. One or both of these records 422, 424 may be used to perform voice dialing operations.

Figure 5:
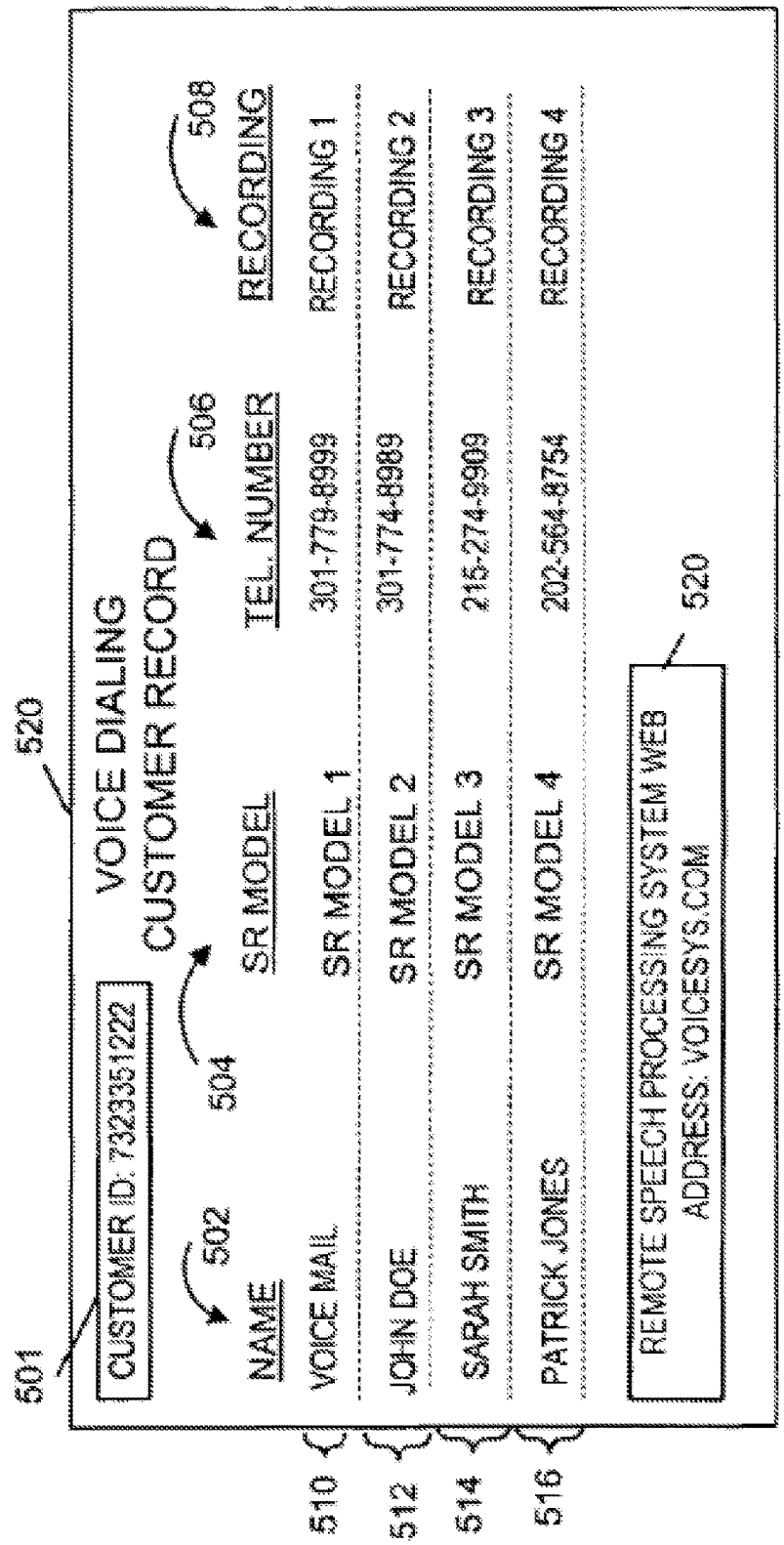
FIG. 5 illustrates a voice dialing customer record implemented in accordance with the present invention.

Referring now to FIG. 5, there is illustrated an exemplary voice dialing customer record 520. As illustrated the voice dialing customer record 520 includes a customer ID 501 which may be, e.g., the customer's home telephone number. It also includes a plurality of dialing entries represented by rows 510, 512, 514, 516. Each dialing entry includes a text version of a name 502 which may be spoken to initiate dialing, a speech recognition model 504 corresponding to the name 502 in the entry, a telephone number 506 to be dialed in the event that the name is recognized and, optionally, a speech recording 508 of the name. After a name is recognized the voice dialing routine may play the recording associated with the recognized name 508 back to the system user as part of a confirmation message such as "calling" followed by the playback of the recording. Alternatively, an audio version of the recognized name may be generated from the text version 502 of the recognized name for confirmation message purpose.

In addition to the name and telephone number information included in the voice dialing customer record 520, the record also includes information 520, e.g., a world wide web Internet address, identifying a remote speech processing facility to be used in the event that a match is not identified between the models in the record and spoken speech being processed for voice dialing purposes or in the event that speech recognition models are to be updated or generated. The memory also includes a contact telephone number 522 where the user can be reached when the computer system's telephone connection is not enabled.

When the voice dialing customer record 520 includes speaker dependent speech recognition models, it may be used as the SD voice dialing customer record 422 shown in FIG. 4. When the voice dialing customer record 520 includes speaker independent speech recognition models, it may be used as the SD voice dialing customer record 424.

Figure 13:
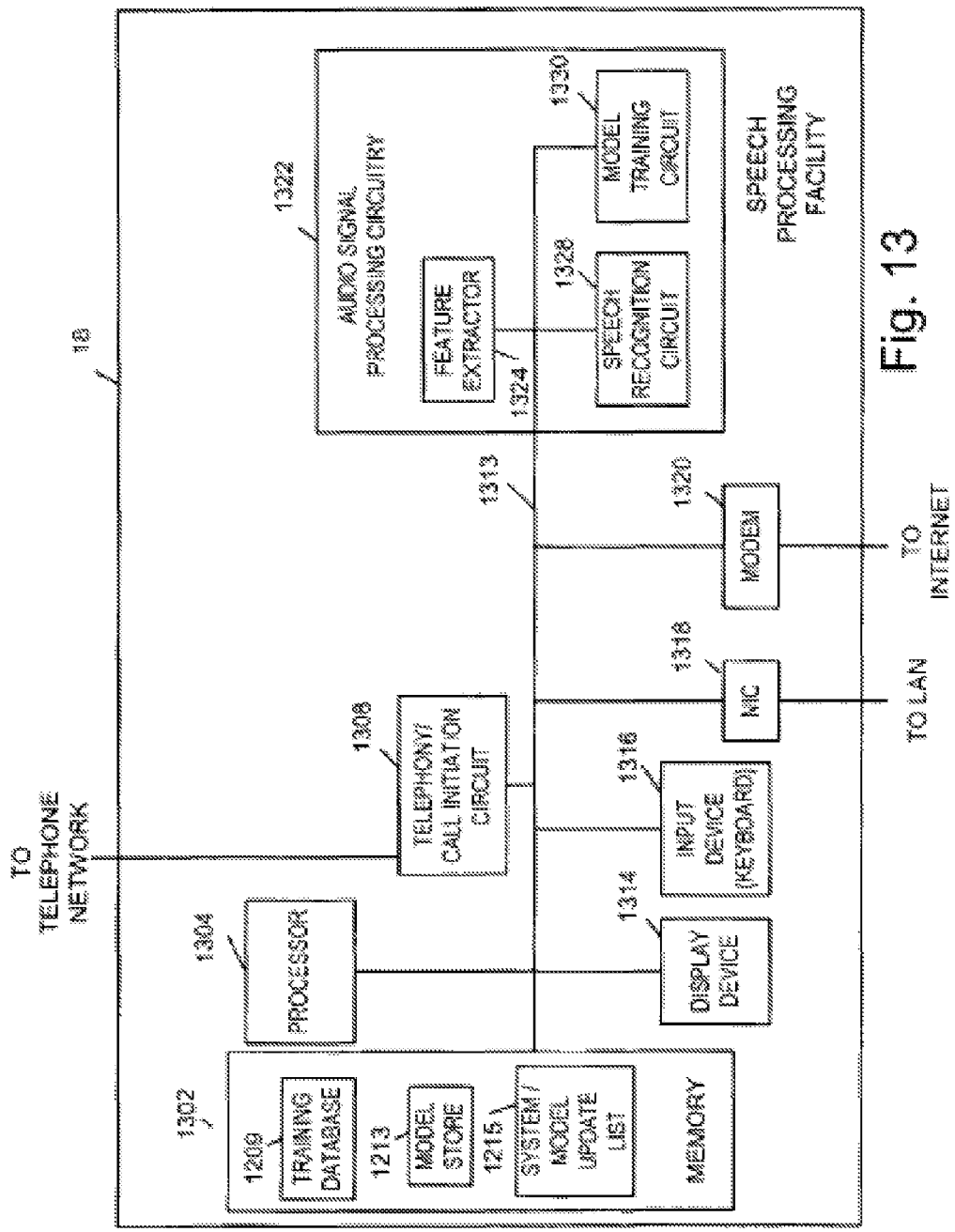
FIG. 13 illustrates a speech processing facility implemented in accordance with one embodiment of the present invention.

Having described the computer system 50 in detail, speech processing facility 18 will now be discussed with reference to FIG. 13. Much of the circuitry shown in the FIG. 13 embodiment of the facility 18 is similar to that previously discussed with regard to the computer system 50. However, in the case of processors, buses, etc. the speech processing facility 18 is generally equipped with higher capacity devices, e.g., fast processors, a large amount of memory, high bandwidth bus, redundant LAN, telephone and Internet connections, etc.

As illustrated the speech processing system 18 includes memory 1302, a processor 1304, display device 1314, input device 1316, telephony/call initiation circuit 1308, network interface card (NIC) 1318, modem 1320 and audio signal processing circuitry 1322 which are coupled together via bus 1313. Processor 1304, under direction of routines stored in memory 1302, controls the operation of the system 18. Information and data may be displayed to a system administrator via display 1314 while data may be manually entered into the system 18 via input device 1316. The NIC 1318 can be used to couple the system to a local area network (LAN) or other computer network. Modem 1320 may be, e.g., a DSL modem, cable modem or other type of modem which can be used to connect the computer system to the Internet 30. Thus, via modem 1320 the system 18 can receive data from, and transmit data to, other devices coupled to the Internet 30.

To provide the system 18 with the ability to perform various telephone functions such as dial a telephone number and bridge telephone calls, the system 18 includes telephony/call initiation circuit 1308.

In order to support speech recognition model training, and speech recognition operations audio signal processing circuitry 1322 is provided. Processing circuitry 1322 includes a feature extractor circuit 1324, a speech recognition circuit 1328, and a model training circuit 1330 which are all coupled to bus 1313. Thus, the components of the audio signal processing circuitry 1322 can receive audio signals and extracted speech feature information via bus 1313. Extracted feature information, received speech, and generated speech recognition models can be stored in memory 1302. Memory 1302 is also used to store various routines and data used by the various components of the system 18.

The contents of the memory 1302 may include voice dialing data including voice dialing customer records for multiple customers. The memory 1302 also includes various speech recognition, call initiation and model training routines. In addition, the memory 1302 includes a training database 1209 which is a collection of speech samples used for training speech recognition models, a model store 1213 for storing generated speech recognition models and a system/model update list which includes information on remote systems which are serviced by the speech processing system, the information includes, e.g., system identification and contact information such as an E-mail address, the type of speech recognition models used by the individual systems, the words in each systems' speech recognition vocabulary, and information on when to update the each systems speech recognition models.

Use of the speech processing facility to perform various operations, e.g., voice dialing, speech recognition model training and speech recognition operations, will be discussed in detail below.

Figure 6:
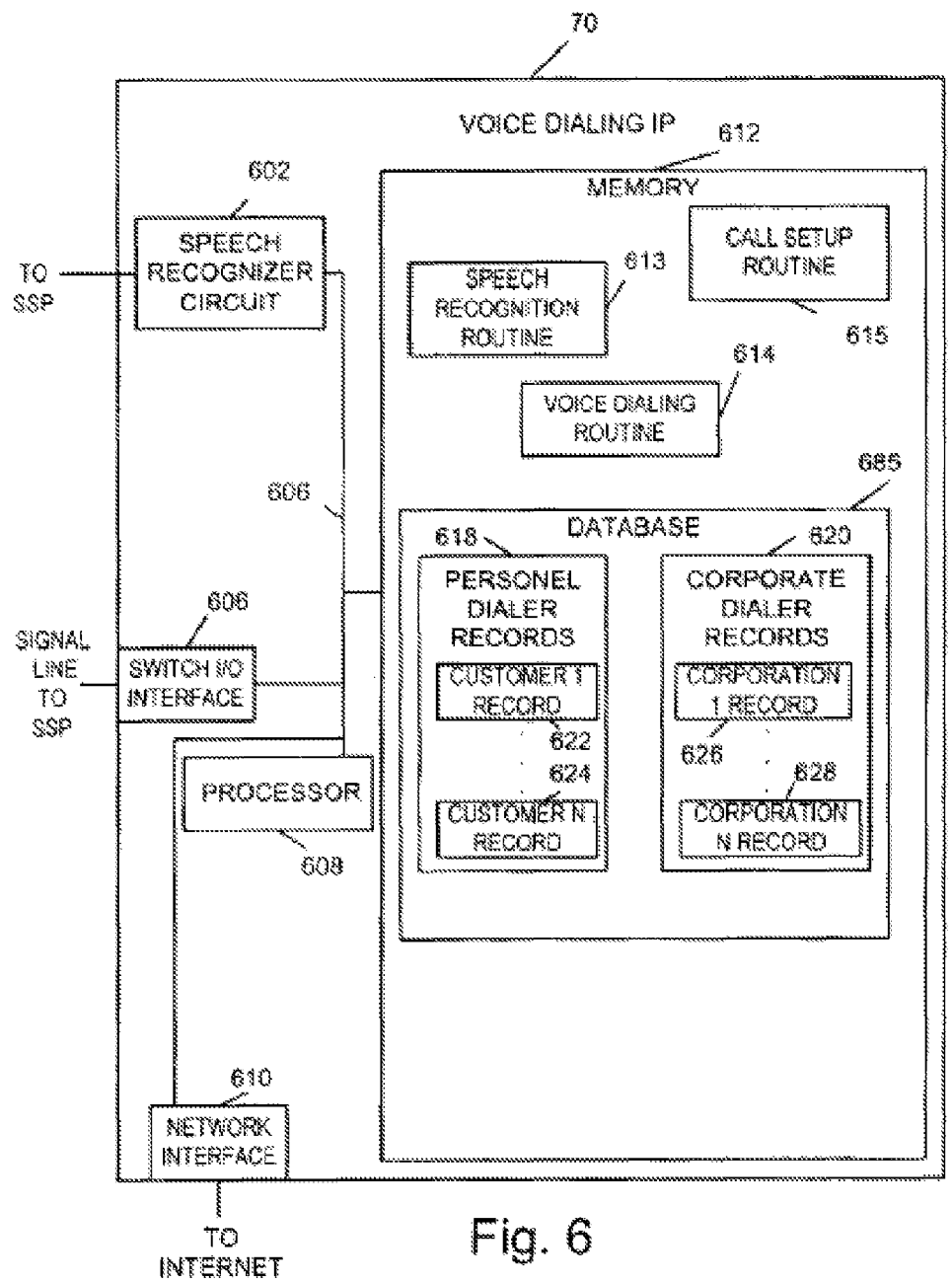
FIG. 6 illustrates a voice dialing IP device which may be used in the system illustrated in FIG. 1.

While speech processing facility 18 can support a wider range of speech processing operations including voice dialing, specific telephone switch peripheral devices such as VD IP 70 may be dedicated to supporting voice dialing operations. An exemplary voice dialing IP 70 which may be used as the voice dialing IP of FIG. 2 is shown in detail in FIG. 6. The VD IP 70 can support voice dialing operations in response to speech received via a conventional telephone connection or via the Internet 30. Thus, the computer system 50 can use the VD IP 70 to perform a voice dialing operation. This can be done by E-mailing the VD-IP 70 a voice dialing request message including speech in an attached file.

The VD IP 70 includes a speech recognizer circuit 602, switch I/O interface 607, network interface 610, processor 608 and memory 612. The processor 608 is responsible for controlling the overall operation of the voice dialing IP 70 under control of routines stored in memory 612. Memory 612 includes a speech recognition routine 613 which may be loaded into the speech recognizer circuit 602, a voice dialing routine 614 and a call setup routine 615. The voice dialing routine 614 is responsible for controlling the supply of audio signals to the speech recognizer circuit 602 and controlling various operations in response to recognition results supplied by the recognizer circuit 602.

Speech recognizer 602 is coupled to a switch, e.g., SSP and receives voice signals therefrom. The speech recognizer circuit 602 uses speech recognition models stored in the memory 612 and the speech recognition routine 613 to perform a speech recognition operation on audio signals received from a telephone switch or from the Internet via network interface 610. Speech recognition models used by the speech recognizer 602 may be speaker independent and/or speaker dependent models. The speech recognition models are retrieved from the personal dialer and corporate records 618, 620 based on a customer identifier which identifiers the particular customer whose speech is to be processed.

The voice dialing routine 614 receives information from the speech recognition circuit 602 which indicates the outcome of a speech recognition operation, e.g., whether a name in the customer's record was recognized. If a name is recognized, and speech was received via the Internet, the telephone number corresponding to the recognized name is returned via the Internet to the device which provided the speech. However, if a contact telephone number was received via the Internet with the speech to be processed, the voice dialing routine 614 calls the call setup routine 615 which is responsible for imitating a call to the telephone number corresponding to the recognized name.

In such a case, where the customer's computer 50 will not be used to place the call, the call setup routine 615 signals the telephone switch via interface 606 to initiate a call to the contact telephone number where the subscriber can be reached and to the telephone number corresponding to the recognized name. Once both parties answer, the call setup routine instructs the switch to bridge the calls thereby completing a call between the Internet based voice dialing service user and the party being called.

Figure 8:
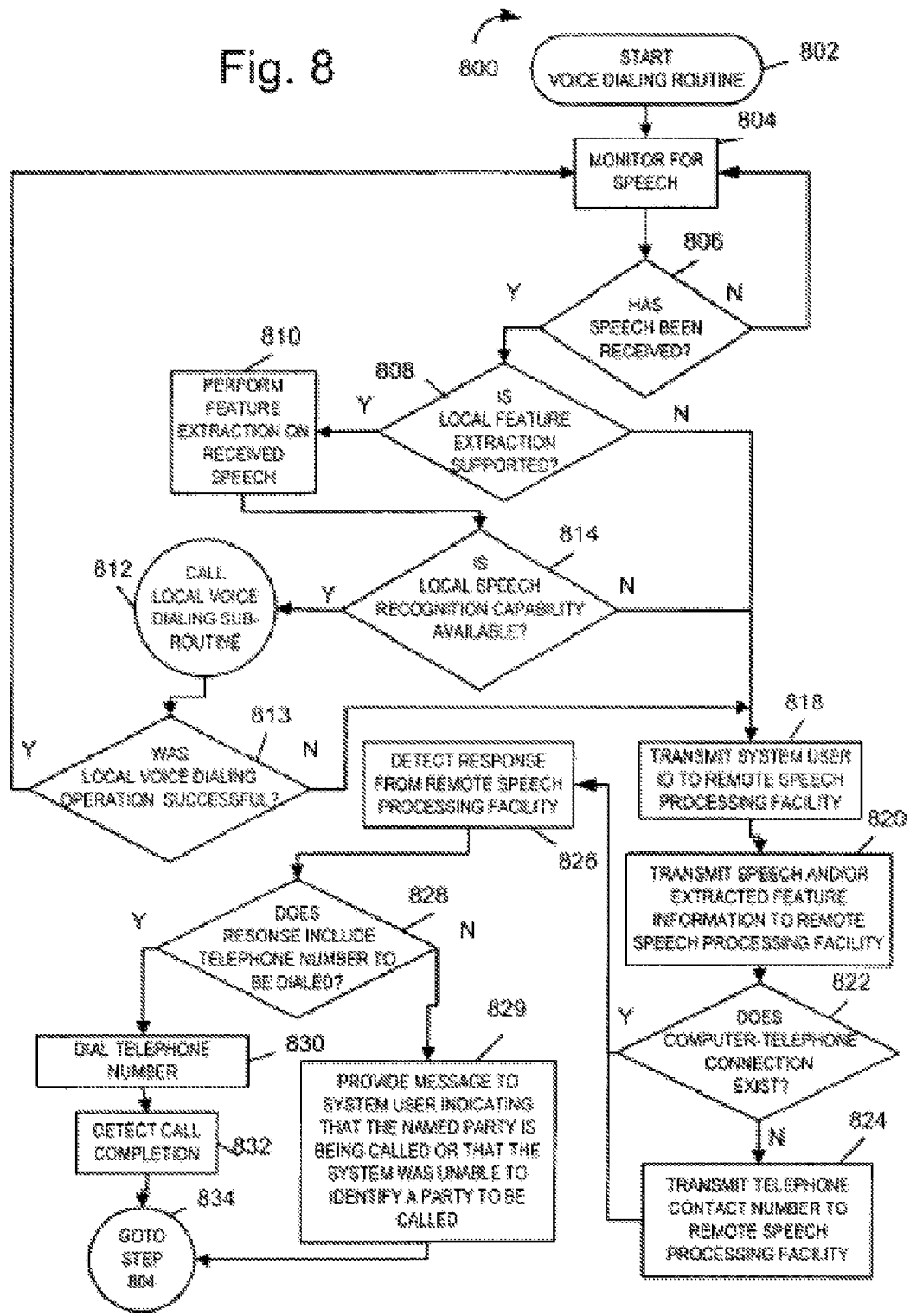
FIG. 8 illustrates an exemplary voice dialing routine of the present invention.

Instead of using VD IP 70, computer system 50 can use the speech processing facility 18 to support a voice dialing operation. Voice dialing will now be described from the perspective of computer system 50 as it interacts with speech processing facility 18. FIG. 8 illustrates an exemplary voice dialing routine 416 which may be executed by the computer system 50.

The voice dialing routine 800 begins in start step 802 when it is executed, e.g., by the processor 305 of computer system 50. From step 802, operation proceeds to step 804 wherein the routine monitors for speech input. If in step 806, it is determined that speech was received in step 804, operation proceeds to step 808. Otherwise, operation returns to monitoring step 804.

In step 808 a determination is made as to whether or not local speech feature extraction is supported. If it is not, operation proceeds directly to step 818. However, if local feature extraction is supported, e.g., feature extractor 324 is present, operation proceeds to step 810 wherein a feature extraction operation is performed on the received speech. Next in step 814 a determination is made as to whether or not local speech recognition capability is available, e.g., a determination is made whether or not the system 50 includes speech recognition circuit 328. If in step 328 it is determined that local speech recognition is not available, operation proceeds directly to step 818. However, if local speech recognition capability is available, operation proceeds to step 812 wherein a local voice dialing sub-routine, e.g., the subroutine 900 illustrated in FIG. 9 is called.

Figure 9:
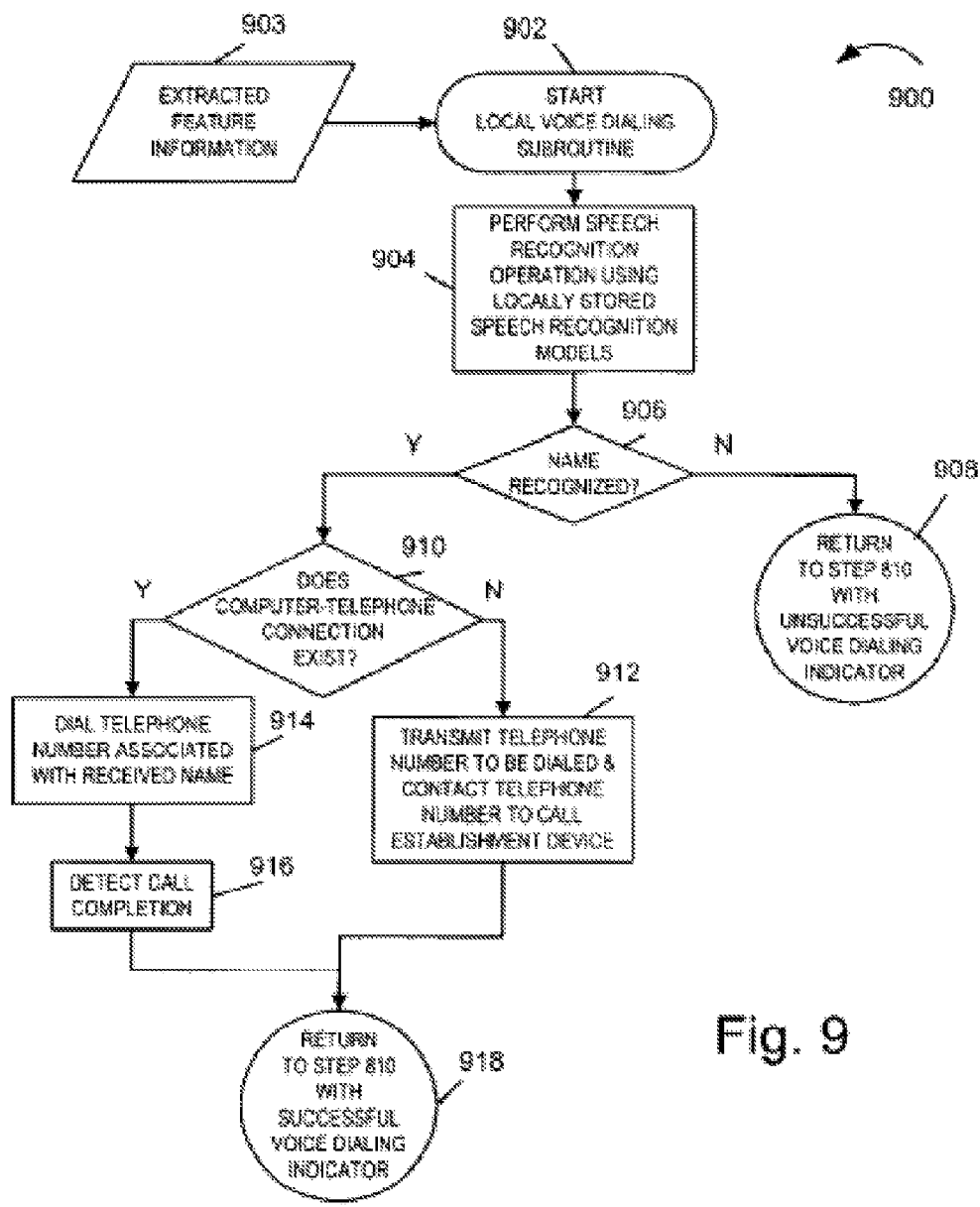
FIG. 9 illustrates a local voice dialing subroutine of the present invention.

Referring now briefly to FIG. 9, it can be seen that FIG. 9 illustrates a local voice dialing subroutine 900 which can be executed by the computer system 50. The subroutine 900 can be used by the computer system 50 to perform voice dialing calls without having to contact an external voice dialing or speech processing facility. The subroutine 900 begins in start step 902, e.g., in response to being called by voice dialing routine 800. In step 902, the subroutine is provided with the extracted feature information 903 produced, e.g., in step 810, from the speech which is to be processed for voice dialing purposes. Operation then proceeds to step 904 wherein a speech recognition operation is performed using the received extracted speech feature information and one or more locally stored speech recognition models, e.g., speech recognition models obtained from the SD voice dialing customer record 422 or SI voice dialing customer record 424 stored in memory 302.

In step 906 a determination is made as to whether or not a name was recognized as a result of the voice dialing operation. If a name was not recognized operation proceeds to return step 908 wherein operation returns to step 812 of the voice dialing routine 800 with an indicator that the local voice dialing operation was unsuccessful.

However, if a name was recognized by the speech recognition operation of step 904, operation proceeds from step 906 to step 910. In step 910, a determination is made as to whether or not a computer to telephone connection exists. If the computer system 50 is connected to a telephone line, operation will proceed to step 914. In step 914, the computer system 50 is made to dial the telephone number associated, e.g., in one of the voice dialing records 422, 424, with the recognized name. Then, in step 916, the computer system 50 detects completion of the call initiated in step 914 before proceeding to step 918.

If in step 910 it was determined that a computer-telephone connection did not exist, operation proceeds to step 912. In step 912, the telephone number to be dialed, i.e., the telephone number associated with the recognized name and the contact telephone number where the user of the system 50 can be reached, is transmitted, e.g., via the Internet, to a call establishment device such as conference calling IP 78. The conference calling IP will initiate calls to both the number associated the recognized name and the contact number and then bridge the calls. In this manner, voice dialing can be used to place a call even when the computer system 50 is not coupled to a telephone line.

From step 912 operation proceeds to return step 918. In return step 918 operation is returned to step 812 of the voice dialing routine 800 with an indicator, notifying the routine 800 that the local voice dialing operation was successful. The indication may be, e.g., a pre-selected value, message or other signal.

Upon a return from the local voice dialing sub-routine 900, operation proceeds from step 812 to step 813. In step 813 a determination is made as to whether or not the local voice dialing operation was successful. This is determined by success/failure information returned from the sub-routine 900. If the local voice dialing operation was successful, operation proceeds to monitoring step 804 in preparation for another voice dialing operation. However, if the local voice dialing operation was not successful, operation proceeds to step 818 in an attempt to use outside resources, such as the speech process facility 18 or VD IP 70, to determine a telephone number to be dialed.

In step 818 a system user ID is transmitted to the remote speech processing facility 18. Then, in step 820 the received speech and/or extracted feature information is transmitted to the remote speech processing facility 18. Next, in step 822 a determination is made as to whether a computer to telephone line connection exits. If in step 822, it is determined that a computer-telephone connection does not exist, indicating that the system 50 cannot make a call, operation proceeds to step 824 wherein a telephone contact number 401 is transmitted to the remote speech processing facility. The telephone contact number 401 is the telephone number of a telephone where the user of the system 50 can be reached.

Operation proceeds from step 824 to step 826. In the event it is determined in step 822 that a computer-telephone connection exists, operation will proceed directly from step 822 to step 826.

As will be discussed below, in response to the transmitted information, the speech processing facility 18 executes a voice dialing routine. Upon detecting the name of a party having an associated telephone number, the executed routine returns, e.g., in an E-mail message, the telephone number associated with the recognized name via the Internet assuming a contact telephone number was not provided to the facility 18. The telephone number can than be used by the computer system 50 to place a call to the party whose name was spoken. In the case where the computer system provides a contact telephone number to the speech processing system 18, the system 18 realizes that the computer 50 cannot place the call. In such a case, the remote speech processing facility 18 returns a signal indicating that the named party is being called assuming a name was recognized or that the system was unable to identify a party to be called in the event a name was not recognized.

In step 826, the computer system 50 detects the response sent by the speech processing facility in response to the speech and voice dialing information supplied to the facility. In step 828 a determination is made as to whether or not the received response includes a telephone number to be dialed. If the response does not include a telephone number to be dialed, operation proceeds to step 829 where the system user is provided a message indicating the results of the remote voice dialing operation. That is, the system user is notified if the named party is being called or that the system was unable to identify a party to be called. The message to be provided is indicated by the response received from the speech processing facility 18. Operation proceeds from notification step 829 via GOTO step 834 to monitoring step 804.

Assuming a telephone number is received from the remote speech processing facility, operation will proceed from step 826 to step 830 wherein the computer system 50 dials the received telephone number. After call completion is detected in step 832, operation proceeds to step 804 via GOTO step 834. In this manner, the voice dialing routine returns to a state of monitoring for speech input, e.g., input associated with an attempt to place another telephone call.

Voice dialing from the perspective of the speech processing facility will now be described with reference to FIG. 10.

Figure 10:
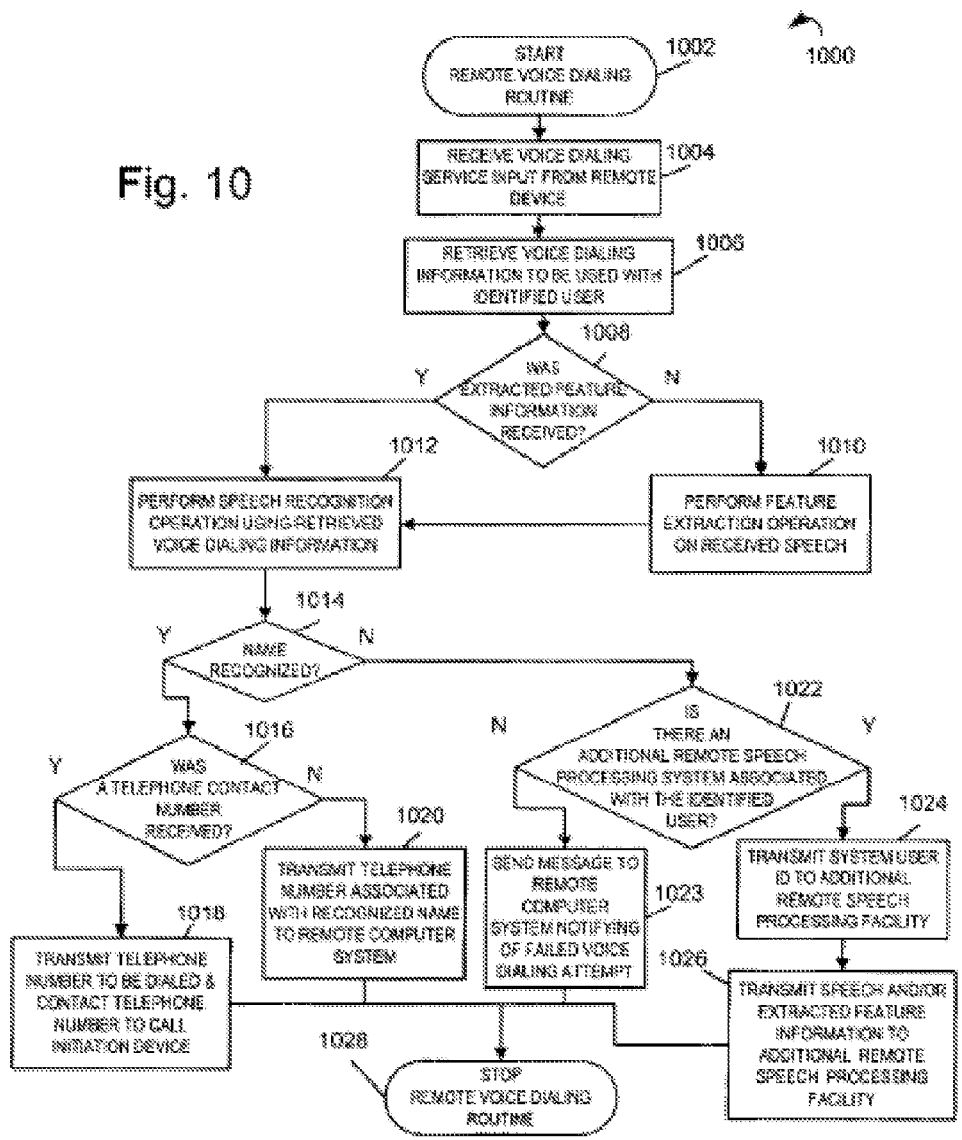
FIG. 10 illustrates a remote voice dialing routine implemented in accordance with the present invention.

A remote voice dialing routine 1000 which may be implemented by, e.g., speech processing facility 18, is illustrated in FIG. 10. The routine starts in step 1002 when it is executed by the speech processing facility's processor. In step 1004, voice dialing service input is received from a remote device, e.g. computer system 50, via a communications channel such as the Internet. In the case of a voice dialing operation, the input will normally include a user ID, speech and/or extracted feature information, and optionally, a telephone contact number where the system user can be reached by telephone. This information corresponds to the information normally transmitted by the computer system 50 in steps 818, 822 and 824 of voice dialing routine 800.

Next, in step 1006, voice dialing information is retrieved from memory. The retrieved information may include, e.g., a voice dialing record including speech recognition models and corresponding telephone numbers to be used in providing voice dialing services for the identified user. The voice dialing record may be a customer specific record, e.g., part of a personal voice dialing record corresponding to the received user ID, or a common voice dialing record such as a corporate voice dialing directory shared by many individuals including the user identified by the received user ID.

After the dialing directory information has been retrieved, operation proceeds to step 1008 wherein a determination is made as to whether or not extracted feature information was received. If extracted feature information was received operation proceeds directly to step 1012. If extracted feature information was not received operation proceeds to step 1010 wherein a feature extraction operation is performed on the received speech. Operation proceeds from step 1010 to step 1012.

In step 1012 a speech recognition operation is performed using the retrieved voice dialing information, e.g., speech recognition models, and received or extracted feature information. The results of the speech recognition operation are supplied to step 1014 wherein a determination is made as to whether a name in the voice dialing directory being used was identified. If a name was identified operation proceeds to step 1016.

In step 1016 a determination is made as to whether or not a telephone contact number was received, e.g., in step 1004. If a telephone contact number was received, indicating that the user can't, or does not want to, initiate a call from his/her computer, operation proceeds to step 1018.

In step 1018 the telephone number to be dialed, i.e., the telephone number associated in the retrieved voice dialing information and the contact telephone number is transmitted to a call initiation device. The user's ID information may also be transmitted to the call initiation device. The call initiation device may be, e.g., conference calling IP 78 or circuitry interval to the speech processing system 18.

When the call initiation device is an external device such as conference calling IP 78, the telephone number to be dialed, the contact telephone number, and the user ID information is transmitted to the call initiation device over any one of a plurality of communication channels including the Internet, a LAN, and conventional telephone lines. In response to receiving the transmitted information the call initiation device executes a call establishment routine, e.g., the routine 1100 illustrated in FIG. 11, will initiate a call to both the telephone number to be dialed and the contact telephone number and then bridge the calls when they are answered. From step 1018 of FIG. 10, operation proceeds to step 1028.

In step 1016, of FIG. 10, if it is determined that a telephone contact number was not received, e.g., because the device which transmitted the voice dialing information is capable of initiating a call, operation proceeds to step 1020 wherein the telephone number to be dialed is transmitted (returned) to the remote computer system 50 in response to the received voice dialing information, e.g., received speech and user ID information. Then operation proceeds to step 1028.

Referring once again to step 1014 if it is determined in this step that a name was not recognized by the speech recognition operation then processing proceeds to step 1022 instead of step 1016. In step 1022 a determination is made as to whether there is an additional remote speech processing system associated with the identified user, e.g., another system such as VD IP 70 which can be used support a voice dialing operation. This determination may be made by checking information about the user stored in memory.

If the answer to the inquiry made in step 1022 is no, operation proceeds to notification step 1023 prior to proceeding to STOP step 1028. In step 1023 a message is sent back to the system 50 indicating to the system that the voice dialing attempt failed due to a failure to recognize a name.

If in step 1022 it is determined that there is an additional remote speech processing system associated with the identified user, operation will proceed from step 1022 to step 1024. In step 1024 the user ID information is transmitted to the additional remote speech processing facility associated with the identified user. Then, in step 1026, the previously received speech information and/or feature information is transmitted to the additional remote speech processing facility. Thus, the additional remote speech processing facility is provided an opportunity to provide a voice dialing service when the current facility is unable to ascertain a telephone number to be dialed. The additional speech processing facility, e.g., VD IP 70, will notify the user's system 50 of the ultimate outcome of the voice dialing operation.

Operation proceeds from step 1026 to STOP step 1028 wherein the remote voice dialing routine 1028 is stopped pending its execution to service additional voice dialing service requests.

Figure 11:
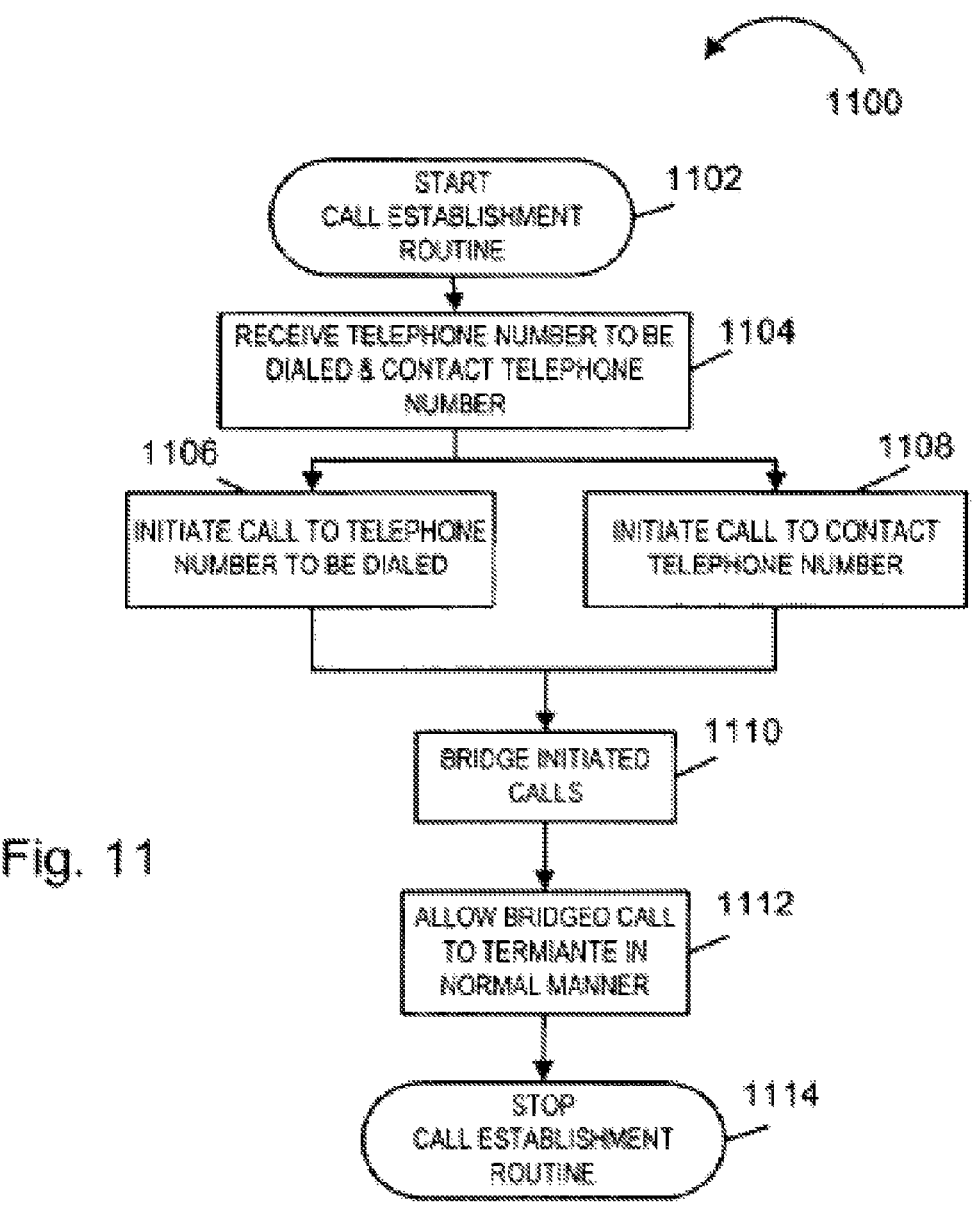
FIG. 11 illustrates a call establishment routine of the present invention.

FIG. 11 illustrates a call establishment routine 1100 that is executed by a call initiation device, such as the conference calling IP 78 or telephone call initiation circuit 1308, in response to call initiation information received as part of a voice dialing operation.

As illustrated in FIG. 11, the call establishment routine starts in step 1102 when it is executed, e.g., by a processor in the conference IP 78. Then, in step 1104 a user ID, a telephone number to be dialed and a contact telephone number is received, e.g., from the speech processing facility 18 via an Internet or telephone communications channel. Such a set of information is recognized as a request for a call initiation and bridging operation. When such information is received operation proceeds to steps 1106 and 1108. In step 1106 the conference calling IP initiates a call using the telephone number to be dialed while in step 1108 the contact telephone number is used to initiate a call. The initiation of the calls in steps 1106, 1108 may occur in parallel or serially. Once the two calls are answered, in step 1110, the calls are bridged. Then in step 1112 the bridged call is allowed to terminate normally, e.g., by either of the called parties hanging up their telephone. With the termination of the bridged call, the call establishment routine STOPS in step 1114 pending its re-execution to service additional dialing requests from, e.g., the speech processing facility 18.

In addition to supporting voice dialing operations, the speech processing 18 is capable of receiving speech signals, e.g., in compressed or uncompressed digital form, generating speech recognition models from the received speech, and then distributing the generated models to one or more devices, e.g., voice dialing IPs, business sites which perform speech recognition, and individual computer systems 50. In accordance with one feature of the present invention speech to be used in speech recognition model training operations, and the models generated there from, are transmitted over the Internet. Alternatively, other communications channels such as conventional telephone lines may be used for this purpose.

Figure 7:
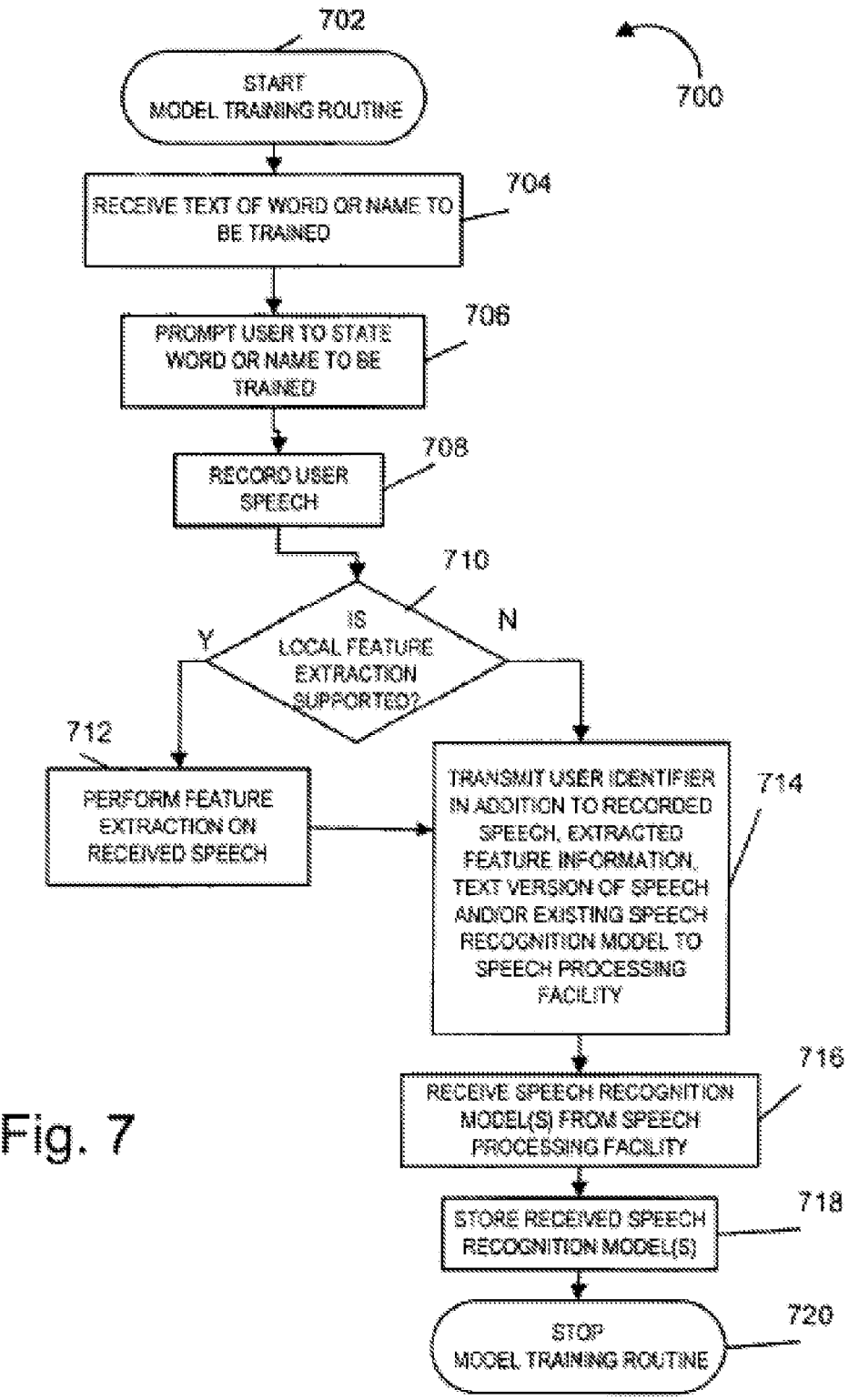
FIG. 7 illustrates a model training routine of the present invention.

Speech recognition model training will now be discussed in detail. FIG. 7 illustrates a model training routine 700 which may be executed under control of a user of the computer system 50 when the user desires to train a new speech recognition model or to update an existing model, e.g., because of unsatisfactory recognition results.

The model training routine 700 begins in step 702 wherein it is initially executed by the processor 304. Operation proceeds to step 704 wherein the processor 304 receives text corresponding to the word or name to be trained or retrained. The text may be entered by a user of the computer system 50 via keyboard 316.

In response to receiving the text version of the word or name to be trained, e.g., modeled, in step 706 the user is prompted to state the word or name to be trained. Then, in step 708 speech received from the user is recorded by the digital recording circuit 326. Next, in step 710 a determination is made as to whether or not local feature extraction is supported. Assuming a feature extractor 324 is included in the computer system 50, operation proceeds from step 710 to step 712. In step 712, a feature extraction operation is performed on the recorded speech resulting in the generation of a set of feature vectors corresponding to the speech to be modeled.

Since the set of feature vectors includes speech characteristic information, e.g., timing, duration, amplitude and/or power information and/or changes in these values over time, and not the actual digitized speech, the set of feature vectors generated in step 712 is often considerably smaller than the digital recording from which the set of feature vectors is generated.

Operation proceeds from step 712 to step 714. In cases where local feature extraction is not supported, operation proceeds directly from step 710 to step 714.

In step 714 information required from the computer system 50 to train or retrain a speech recognition model and to return the resulting model, is transmitted to a speech processing facility, e.g., via the Internet. In step 714 a user identifier is transmitted to the speech processing facility. In addition a text version of the speech to be modeled, the extracted set of feature information corresponding to the speech to be modeled, the digital recording of the speech to be modeled and/or an already existing speech recognition model corresponding to the speech to be modeled is transmitted to the speech processing facility.

As will be discussed below, the speech processing facility 18 processes the transmitted speech or feature information by using it in a speech recognition model training process. The speech recognition model generated by the speech processing facility 18 is then returned to the computer system 50 for storage and/or use in speech recognition operations.

From step 714 operation of the computer system 50 proceeds to step 716 wherein the system 50 receives, e.g., via the Internet, one or more speech recognition models from the speech processing facility 18. The received speech recognition models will include the model or models generated from the speech extracted feature information and/or other information transmitted to the speech processing facility in step 714.

The received speech recognition models are stored in the computer system's memory 302 in step 718. In the case of updated or retrained models, the received model will replace the previous model or models corresponding to the same words, names or sounds.

As a result of storage in the memory 302, the speech recognition models will be available to applications which perform speech recognition such as the voice dialing and word processor applications. After storage of the received models, the new model training routine 700 then stops in step 720 until being executed again to train an additional model.

Figure 12:
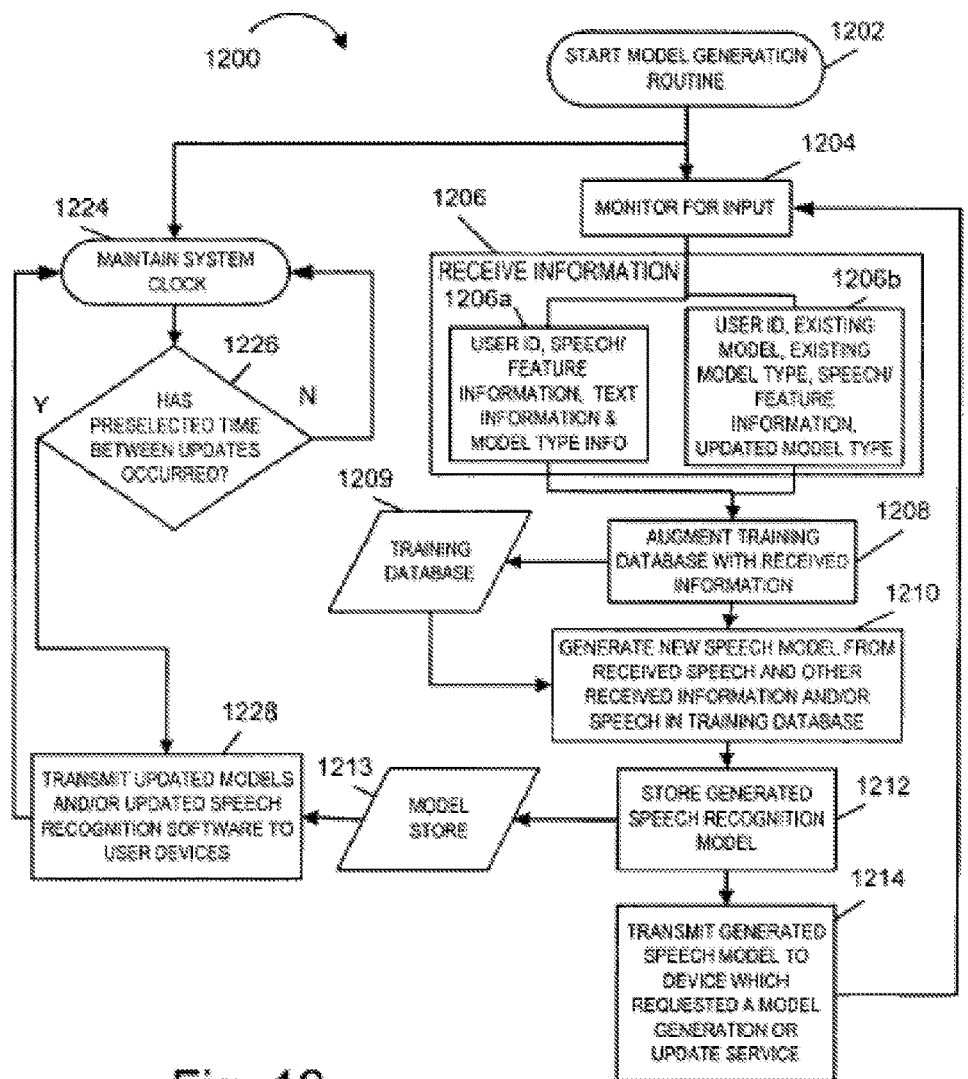
FIG. 12 illustrates a model generation routine of the present invention.

In addition to providing voice dialing service, the speech processing facility 18 can be used to provide speech recognition model training services. FIG. 12 illustrates a model generation routine 1200, which can be implemented by the speech processing facility 18. As illustrated, the routine starts in step 1202 when it is executed by the speech processing facility's processor. Operation then proceeds to steps 1202 and 1204 which represent parallel processing paths. While the processing associated with these paths can be performed in parallel, they can also be performed on a time shared basis as is commonly done in single processor systems.

In step 1204 the system monitors for a model generation and/or model updating service request, e.g., a signal from a device such as the computer system 50 or computerized business system 58 indicating that a speech recognition model needs to be generated or updated. The request may take the form of an E-mail message with an attachment including information, speech and/or other speech data. When a request for such a service is received, e.g. via the Internet 30, operation proceeds to step 1206 wherein the information and data used to provide the requested service is received by the processor 1304, e.g., by extracting the attachment from the E-mail request message. The received information depends on the service to be performed.

Block 1206a illustrates exemplary data that is received with a request to generate a new speech recognition model. The data 1206a includes a User ID, speech or feature information, text information providing a text representation of the word or phrase to be modeled, and optional speech recognition model type information. The User Id may be a telephone number, Email address or some other type of unique identifier. Assuming model type information is not provided a default model type will be used.

Block 1206b illustrates exemplary data that is received with a request to update an existing speech recognition model. The data 1206b includes a User ID, an existing speech recognition model to be updated, existing model type information, speech or feature information, text information providing a text representation of the word or phrase to be modeled, and optional updated speech recognition model type information. If the optional updated speech recognition model type information is not provided, it is assumed that the updated model is to be of the same type as the received existing model.

Operation proceeds from step 1206 to step 1208. In step 1208, the training database 1209 maintained in the speech processing facility 18 is augmented with the speech received in step 1206. Thus, over time, the size and robustness of the speech training database 1211 will improve from the input received from various sources which use the speech processing facility to provide speech recognition model generation and updating services. Since users will tend to retrain models which have been providing poor recognition results the quality of the training data used for numerous subscribers is improved as each subscriber provides new and/or additional speech samples to be used in model training.

From step 1208 operation proceeds to step 1210 wherein a speech recognition model is generated from the received speech, feature information and/or other received information. Various known model training techniques may be used to implement step 1210 with the training technique being used at any given time being determined by the training data available and the type of speech recognition model to be generated.

In the case where speech was received, the speech normally undergoes a feature extraction operation as part of the training process. In the case where speech feature information was received, in addition or in place of speech, the provided feature information, e.g., feature vectors, may be used in model training thereby avoiding the need to perform a feature extraction operation on received speech.

The generated speech recognition model will be of the type specified by the received information. In the case of a speaker dependent speech recognition model type, the generated model will be a speaker dependent speech recognition model. In the case of speaker independent speech recognition model the generated model will be a speaker independent model. Speaker independent models are normally trained using the received speech and speech included in the training database 1209 as training data. Speaker dependent models are normally generated using the received speech as the training data. In addition to indicating whether a generated model is to be speaker independent or speaker dependent the received model type information can indicate particular features or information which are to be used in the model, e.g., energy and delta energy coefficient information. In the case of models which are being updated, the updated model type information can specify a different model type than the existing model type information.

In one particular application, a dynamic time warping (DTW) template is received and processed along with speech to generate a speaker dependent Hidden Markov model as an updated model. In such an embodiment the received existing model type information would be e.g., "DTW template" and the updated model type information would be "SD HMM" indicating a speaker dependent HMM. In this particular application, the template to HMM model conversion and training techniques discussed in U.S. Pat. No. 6,014,624 which is hereby expressly incorporated by reference may be used in the model generation step 1210.

With the new or updated model generated, operation proceeds from step 1210 to step 1212. In step 1212, the generated model is stored in the speech processing facility's model store 1213. The model store includes separate sets of models for individual users, and a common model store for speaker independent models. The speaker independent models are stored in the corresponding user's model set which generated speaker independent models are stored in the speaker independent model set. The models may be stored according to their intended application as well as type if desired. That is, models intended for voice dialing applications may be stored separately in the model store 1213 from models stored for word processing operations.

From step 1212, operation proceeds to step 1214 wherein the generated speech recognition model is transmitted to the device from which the model generation or updating request was received. Operation then proceeds to step 1204 wherein the processor monitors for additional input, e.g., requests to generate or update additional speech recognition models.

The processing path which begins with step 1224 executes in parallel with the processing path which beings with step 1204. In step 1224 a system clock is maintained. Operation proceeds from step 1224 to step 1226 wherein a determination is made as to whether or not a preselected time corresponding to a selected time interval which is to occur between the transmission of model updates has passed. If the preselected time has not expired operation returns to step 1224. However, if the preselected period of time has expired operation proceeds to step 1228 wherein updated models stored in the model store 1213 are transmitted, e.g., via the Internet 30, to systems which use the speech recognition models, e.g., systems indicated in the update list 1215 stored in the speech processing systems memory. To avoid the needless transmission of models that have not been updated only those speech recognition models which have been updated, as indicated by creation time and date information stored in the model store along with the models, are transmitted to the various systems to be updated. After the updated models are transmitted, operation returns to step 1224.

As an alternative to broadcasting updated speech recognition models on a periodic basis, systems which use speech recognition models can periodically request, from the speech processing facility 18, speech recognition model updates via the Internet.

As discussed above, the speech processing facility 18 can be used to provide speech recognition services in addition to voice dialing and speech recognition model training services. Speech recognition service can be provided to devices, e.g., computer system 50 and business computer system 58, which have speech capture capabilities but may lack speech recognition capabilities or have relatively limited speech recognition capabilities. Systems can transmit to the speech processing facility 18 speech and/or extracted speech feature information, e.g., feature vectors, and receive in response the results of a speech recognition operation performed using the received speech or feature vectors. The speech or feature vectors may be transmitted as a file attachment to an E-mail message sent by the system 50 or 58 over the Internet to the facility 18 requesting a speech recognition operation. The results of the speech recognition operation can be returned by E-mail to the device requesting the speech recognition operation. The results may be in the form of a list of words recognized in the received speech or from the received feature vectors. The words may be included in a text portion of the responsive E-mail message or in a text file attachment.

Figure 14:
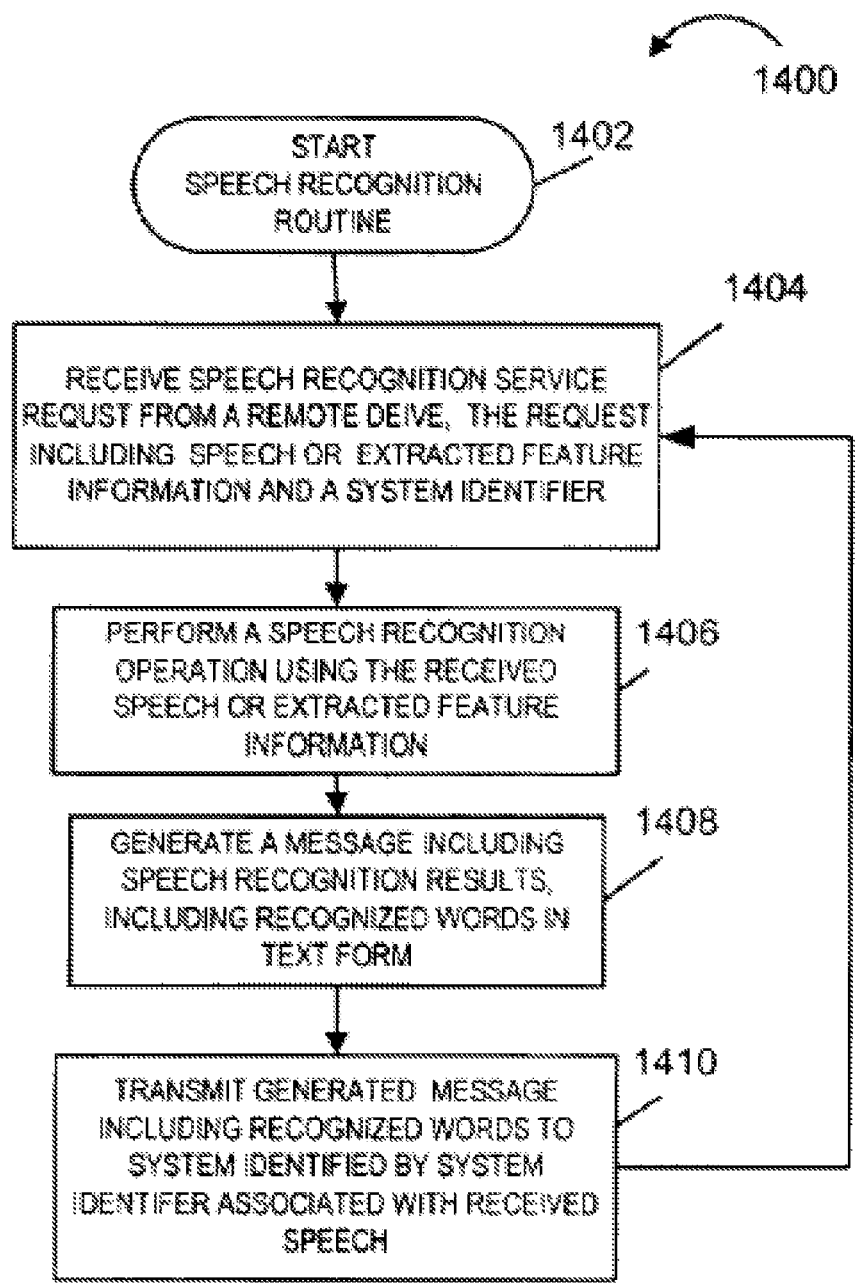
FIG. 14 illustrates a speech recognition routine that can be executed by the speech processing facility of FIG. 13.

FIG. 14 illustrates a speech recognition routine that is implemented by the speech processing facility 18 to service speech processing requests received from various devices coupled to the Internet 30. As illustrated, the routine 1400 begins in step 1402, wherein the routine 1400 is retrieved from memory 1302 and executed by the speech processing facility's processor 1304.

Next, in step 1404, the speech processing system 18 receives a speech recognition service request from a remote device, e.g., system 50 or 58. As mentioned above, the request may take the form of an E-mail message. The received request includes speech, e.g., compressed or uncompressed digitized speech, and/or extracted speech feature information. This data may be included in the form of an attached file. In addition, the message includes a system identifier, e.g., return E-mail address, which can be used to identify the source system to which the speech recognition results are to be returned.

From step 1404 operation proceeds to step 1406 wherein the speech processing facility performs a speech recognition operation using the received speech or received feature information in an attempt to recognize words in the received speech or speech from which the received feature information was extracted. Then, in step 1408 a message is generated including the speech recognition results, e.g., recognized words, in text form. The generated message may be an E-mail message with the source of the speech or feature information being identified as the recipient and the recognized information incorporated into the body of the message or an attached text file.

In step 1410 the generated message including the recognition results is transmitted, e.g., via the Internet 30, to the system which supplied the speech or feature information used to perform the recognition operation. Then operation proceeds to step 1404 to await another request for a speech recognition operation.

Thus, in the above described manner, through the use of the Internet and simple E-mail messages, speech processing facility 18 provides speech recognition services to physically remote devices which are also coupled to the Internet 30.

Numerous variations on the above described methods and apparatus are possible without departing from the scope of the invention.

What is claimed is:

1. A computer-implemented method comprising:
   obtaining a recording of a particular user speaking a name of a contact;
   receiving a voice dialing command including an utterance of the name of the contact by the particular user; and
   in response to receiving the voice dialing command including the utterance of the name of the contact by the particular user, providing, for output, the recording of the particular user speaking the name of the contact or a text-to-speech audio output of the name, and initiating a voice dialing operation between the particular user and the contact.

2. The method of claim 1, wherein obtaining a recording of a particular user speaking a name of a contact is performed by a mobile computing device.

3. The method of claim 1, wherein obtaining a recording of a particular user speaking a name of a contact comprises:
   recording the particular user speaking the name of the contact.

4. The method of claim 1, wherein receiving a voice dialing command including an utterance of the name of the contact by the particular user comprises:
   receiving input that initiates execution of a voice dialing routine; and
   receiving the utterance of the name of the contact by the particular user.

5. The method of claim 1, comprising:
   providing for audible output a confirmation message followed by either the recording of the particular user speaking the name of the contact or the text-to-speech audio output of the name.

6. The method of claim 1, wherein initiating a voice dialing operation between the particular user and the contact comprises:
   initiating a telephone call between the particular user and the contact.

7. A system comprising:
one or more computers and one or more storage devices storing instructions that are operable, when executed by the one or more computers, to cause the one or more computers to perform operations comprising:
   obtaining a recording of a particular user speaking a name of a contact;
   receiving a voice dialing command including an utterance of the name of the contact by the particular user; and
   in response to receiving the voice dialing command including the utterance of the name of the contact by the particular user, providing, for output, the recording of the particular user speaking the name of the contact or a text-to-speech audio output of the name, and initiating a voice dialing operation between the particular user and the contact.

8. The system of claim 7, wherein obtaining a recording of a particular user speaking a name of a contact is performed by a mobile computing device.

9. The system of claim 7, wherein the operations comprise:
   providing for audible output a confirmation message followed by either the recording of the particular user speaking the name of the contact or the text-to-speech audio output of the name.

10. The system of claim 7, wherein obtaining a recording of a particular user speaking a name of a contact comprises:
   recording the particular user speaking the name of the contact.

11. The system of claim 7, wherein receiving a voice dialing command including an utterance of the name of the contact by the particular user comprises:
   receiving input that initiates execution of a voice dialing routine; and
   receiving the utterance of the name of the contact by the particular user.

12. The system of claim 7, wherein initiating a voice dialing operation between the particular user and the contact comprises:
   initiating a telephone call between the particular user and the contact.

13. A non-transitory computer-readable medium storing software comprising instructions executable by one or more computers which, upon such execution, cause the one or more computers to perform operations comprising:
   obtaining a recording of a particular user speaking a name of a contact;
   receiving a voice dialing command including an utterance of the name of the contact by the particular user; and
   in response to receiving the voice dialing command including the utterance of the name of the contact by the particular user, providing, for output, the recording of the particular user speaking the name of the contact or a text-to-speech audio output of the name, and initiating a voice dialing operation between the particular user and the contact.

14. The medium of claim 13, wherein obtaining a recording of a particular user speaking a name of a contact comprises:
   recording the particular user speaking the name of the contact.

15. The medium of claim 13, wherein receiving a voice dialing command including an utterance of the name of the contact by the particular user comprises:
   receiving input that initiates execution of a voice dialing routine; and
   receiving the utterance of the name of the contact by the particular user.

16. The medium of claim 13, wherein initiating a voice dialing operation between the particular user and the contact comprises:
   initiating a telephone call between the particular user and the contact.

17. The medium of claim 13, wherein the operations comprise:
   providing for audible output a confirmation message followed by either the recording of the particular user speaking the name of the contact or the text-to-speech audio output of the name.

* * * * *